United States Patent [19]
Ando et al.

[11] Patent Number: 5,153,609
[45] Date of Patent: Oct. 6, 1992

[54] IMAGE FORMING APPARATUS

[75] Inventors: Toshinori Ando, Yokohama; Yukio Nagase, Kawasaki; Sono Gu, Ohmiya; Kazuhisa Kemmochi, Machida, all of Japan

[73] Assignee: Canon Kabushiki Kaisha, Tokyo, Japan

[21] Appl. No.: 520,876

[22] Filed: May 9, 1990

[30] Foreign Application Priority Data

| May 9, 1989 | [JP] | Japan | 1-114177 |
| May 10, 1989 | [JP] | Japan | 1-117024 |
| May 31, 1989 | [JP] | Japan | 1-138188 |
| May 31, 1989 | [JP] | Japan | 1-138951 |
| May 31, 1989 | [JP] | Japan | 1-138968 |

[51] Int. Cl.$^5$ .............................................. H04N 1/21
[52] U.S. Cl. ................................... 346/108; 355/208
[58] Field of Search .............. 346/108, 107 R, 160; 355/208, 214

[56] References Cited

U.S. PATENT DOCUMENTS

| 4,819,019 | 4/1989 | Egawa et al. | 355/208 |
| 4,855,766 | 8/1989 | Suzuki | 346/108 |

Primary Examiner—Mark J. Reinhart
Attorney, Agent, or Firm—Fitzpatrick, Cella, Harper & Scinto

[57] ABSTRACT

An image forming apparatus has exposure unit for emitting light modified in accordance with image information, the light quantity of said exposure unit being variable, image forming unit for forming image on a photosensitive medium in accordance with light emitted from the exposure unit, detector for detecting the surface state of the photosensitive medium, and controller for optimizing the light quantity of the exposure unit in accordance with the output of the detecting unit. The control unit obtains a potential versus image information variation characteristic of the photosensitive medium based on the output of the detecting unit and sets the light quantity of the exposure unit such that the characteristic approximate a straight line.

20 Claims, 31 Drawing Sheets

AMOUNT OF EXPOSURE

NECESSARY POTENTIAL CONTRAST  $V_D - V_L$ (ABSOLUTE VALUE)

PHOTOSENSITIVE DRUM POTENTIAL (V)

AMOUNT OF EXPOSURE (E)

(STANDARDIZATION)

AMOUNT OF EXPOSURE (E)

IMAGE FORMING APPARATUS

BACKGROUND OF THE INVENTION

This invention relates to an image forming apparatus such as a copying machine and a laser beam printer.

The sensitivity characteristics of a photosensitive member vary with time or variations of environmental conditions such as temperature and humidity. To make up for such variations, it has been proposed to measure the sensitivity characteristic of photosensitive medium by the provision of a sensor, control the surface status of a photosensitive drum by varying the corona charger grid voltage or exposure energy at the time of exposure to image through comparison with the measured characteristic and control the output image density to be constant by varying image forming conditions in accordance with detected temperature or humidity by further adding temperature and/or humidity sensor means to the image forming apparatus.

FIG. 36 shows a prior art example of setting the conditions for image forming through control of the corona charger grid voltage and setting optimum conditions through switching the amount of exposure to laser beam between two levels when a forming condition range exceeds a grid voltage range.

This method is for controlling the photosensitive drum surface potential contrast as image forming condition. In this case, under a constant exposure amount condition, the grid bias is varied continuously, thus varying surface potential $V_D$ on the photosensitive medium to vary the grid bias for obtaining desired potential contrast $V_D - V_L$. However, where the desired potential contrast range is broad, a sufficiently broad variation range can not be obtained with a single exposure amount. For this reason, it is proposed to permit switching of the exposure amount between levels for high and low potential contrast ranges as shown in FIG. 37. More specifically, when the potential contrast exceeds point B, the exposure amount is switched from level Lo to level Hi. In this case of exposure amount switching, the potential contrast control is performed such that the grid bias is varied with the exposure amount to obtain the same potential contrast B and B', as shown in FIG. 36. With this method, the potential contrast is controlled from A through B and B' to C in a case where it is varied in the increasing direction, while it is controlled from C through B' and B to A when it is varied in the reducing direction. In this way, it is possible to control the potential contrast over a wide range.

However, the sensitivity characteristic of photosensitive media varies with individual media. In addition, even with photosensitive medium having identical sensitivity charactetistic, there are liable to characteristic variations because of fluctuations of current characteristics of laser in exposure system and optical efficiency of optical system depending on the image forming apparatus.

With the prior art example noted above, although it is possible to make up for variations with time, it is impossible to make up for initial fluctuations of the sensitivity characteristic of photosensitive medium. For example, the relation between surface potential and grid bias voltage shown in FIG. 36 corresponds to either $V_{D1}$ and $V_{L1}$ or $V_{D2}$ and $V_{L2}$, as shown in FIG. 39, depending on the sensitivity characteristic of the photosensitive medium. If there is desired potential contrast D in this case, with a photosensitive medium having characteristics $V_{D1}$ and $V_{L1}$ the desired potential contrast can be obtained by setting grid bias voltage $V_{G2}$, but with photosensitive medium with characteristics $V_{D1}$ and $V_{D2}$ it can not be obtained with initial preset light amount $L_0$ (it being assumed that $D < B$).

In such prior art example, even if the potential contrast is controlled to be equal at the time of switching of the exposure amount in a potential contrast range subject to the exposure amount switching, i.e., between B and B' in FIG. 36, the image quality, particularly the gradation, is subject to variations between points B and B' because of the influence of the V-E characteristic (i.e., relation between surface potential and exposure amount) accompanying the switching of the exposure amount.

More specifically, FIG. 38A shows V-E characteristic of a typical photosensitive medium such as OPC (organic photo-semiconductor). As is seen, in this V-E characteristic the potential is not varied linearly with the exposure amount. Actual V-E characteristic is as shown in FIG. 38B depending on the maximum exposure amount in use.

Therefore, in case if photosensitive medium control is carried out by the method noted above such as to obtain potential contrast at point B (B') in FIG. 36, there is a problem that the image quality of the output image is subject to variation when the exposure amount switching is effected with a change in the desired potential contrast due to a slight environmental variation. Heretofore, it has been in practice to effect correction of gradation at the time of such exposure amount switching. However, it has been difficult to stabilize the image quality with correction corresponding to the exposure amount change. Particularly, with a full-color image forming apparatus, in which importance is attached to the gradation, it is necessary to stabilize the gradation.

SUMMARY OF THE INVENTION

The present invention has been intended in the light of the foregoing, and it has an object of providing an improved image forming apparatus.

Another object of the invention is to provide an image forming apparatus, which permits formation of adequate image at all time irrespective of environmental variations and fluctuations of individual apparatuses.

A further object of the invention is to provide an image forming apparatus, which permits selection of the sensitivity characteristic of photosensitive medium to be in an optical exposure energy range.

A still further object of the invention is to provide an image forming apparatus, which permits multi-level exposure energy switching in an exposure energy range selected according to sensitivity characteristic.

A yet further object of the invention is to provide an image forming apparatus, with which a hysteresis characteristic is provided in a switching characteristic when switching the exposure amount according to the sensitivity characteristic of photosensitive medium.

A yet another object of the invention is to provide an image forming apparatus, with which an image signal is corrected when switching the exposure amount.

The above and other objects will become more apparent from the following description when the same is read with reference to the accompanying drawings.

DETAILED DESCRIPTION OF PREFERRED EMBODIMENTS

Now, one embodiment of the invention will be described with reference to the drawings.

Figure 1:
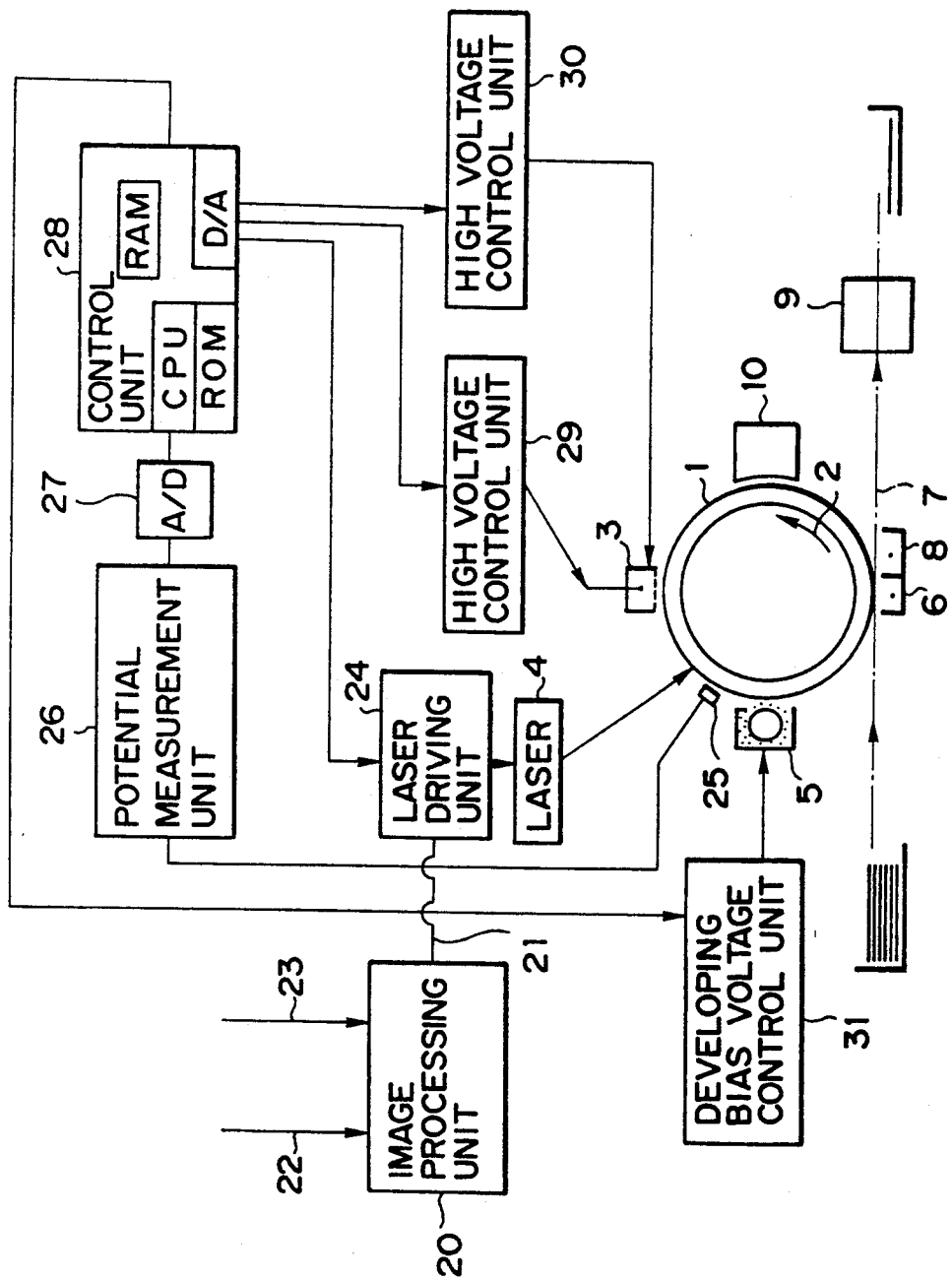
FIG. 1 is a schematic representation of an image forming apparatus embodying the invention.
Figure 2:
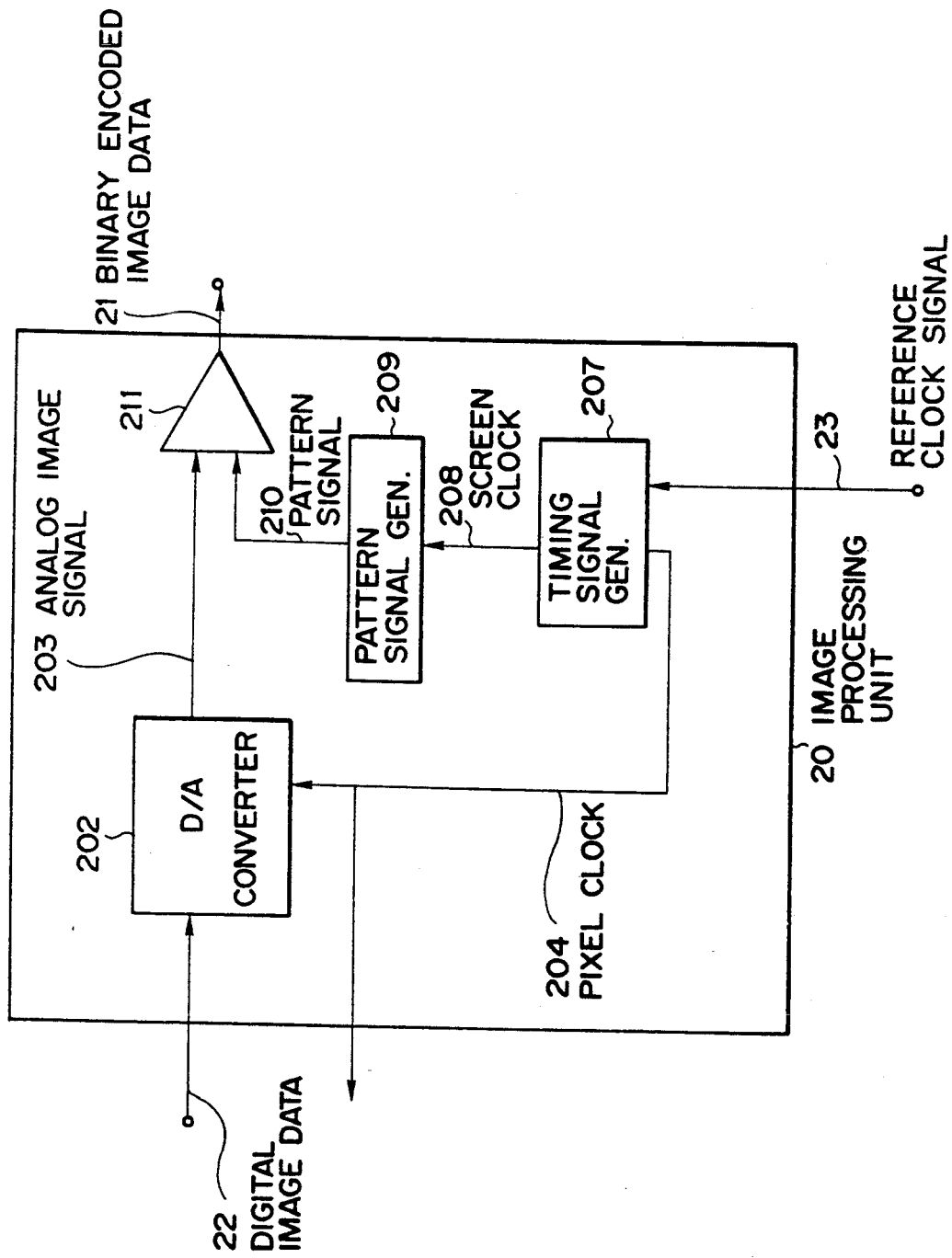
FIG. 2 is a block diagram showing an image processing unit in FIG. 1 in detail.
Figure 3:
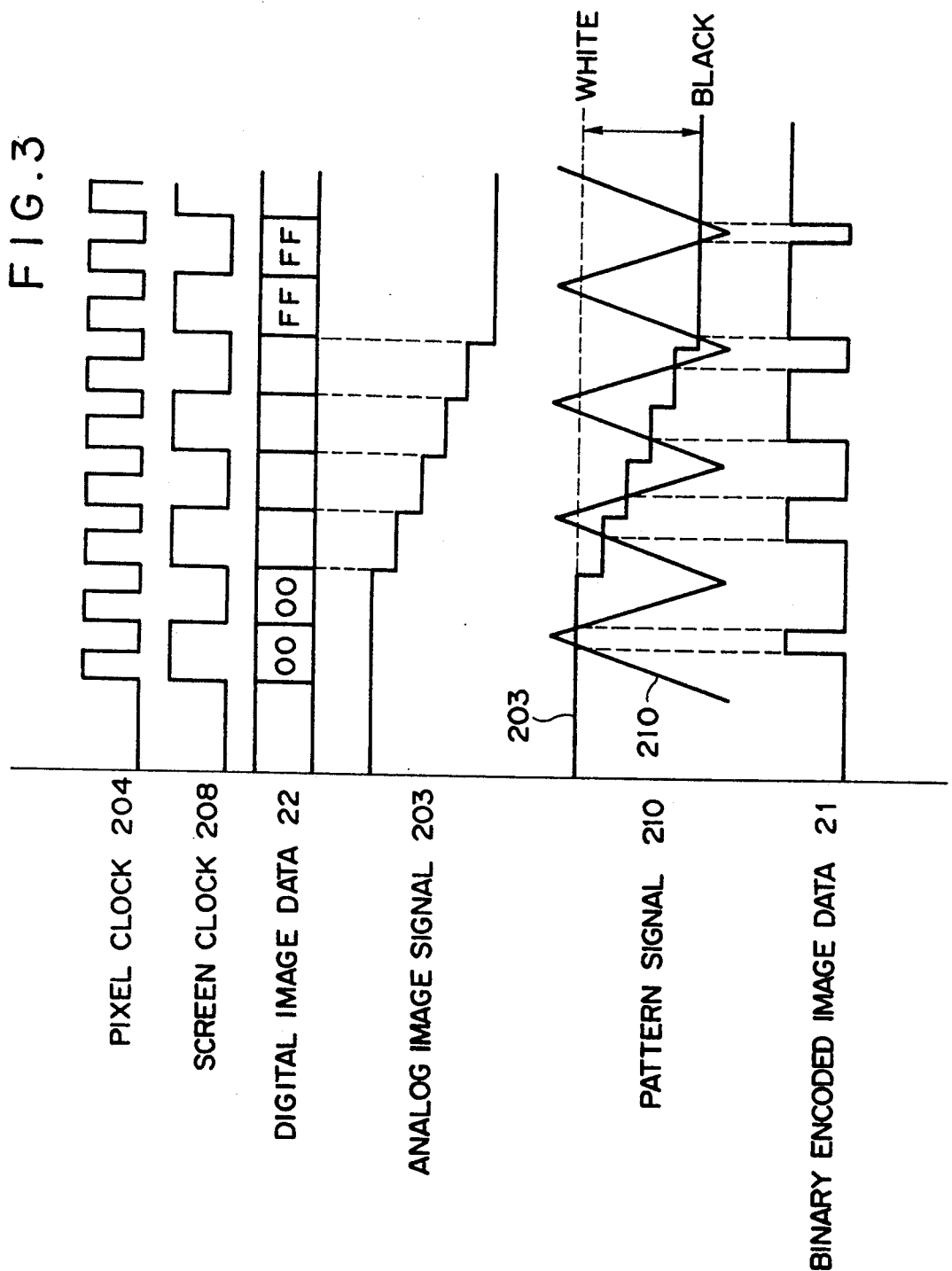
FIG. 3 is a waveform chart showing signal waveforms appearing in various parts of the image processing unit shown in FIG. 2.
Figure 4:
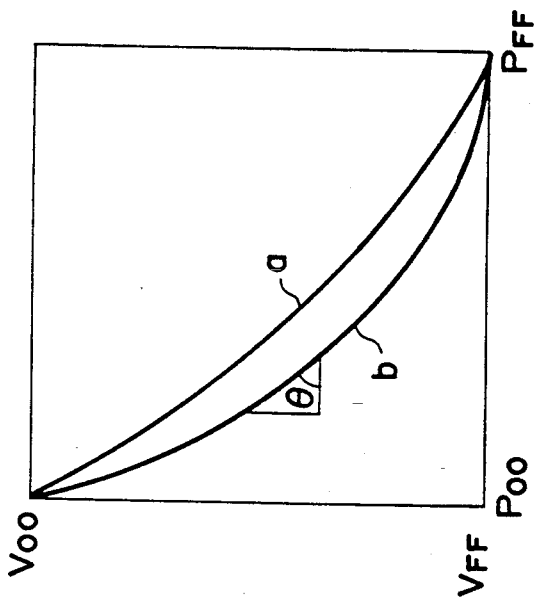
FIG. 4 is a graph showing the relation between potential on and exposure amount of a photosensitive medium.
Figure 5:
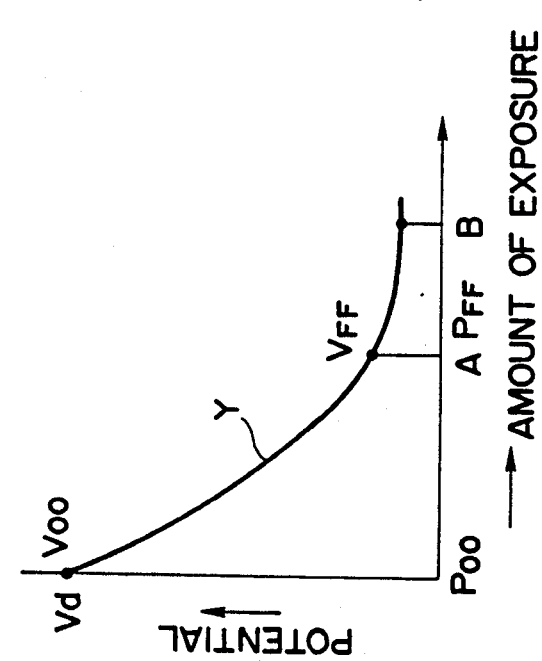
FIG. 5 is a graph showing the relation between potential and image signal.
Figure 6:
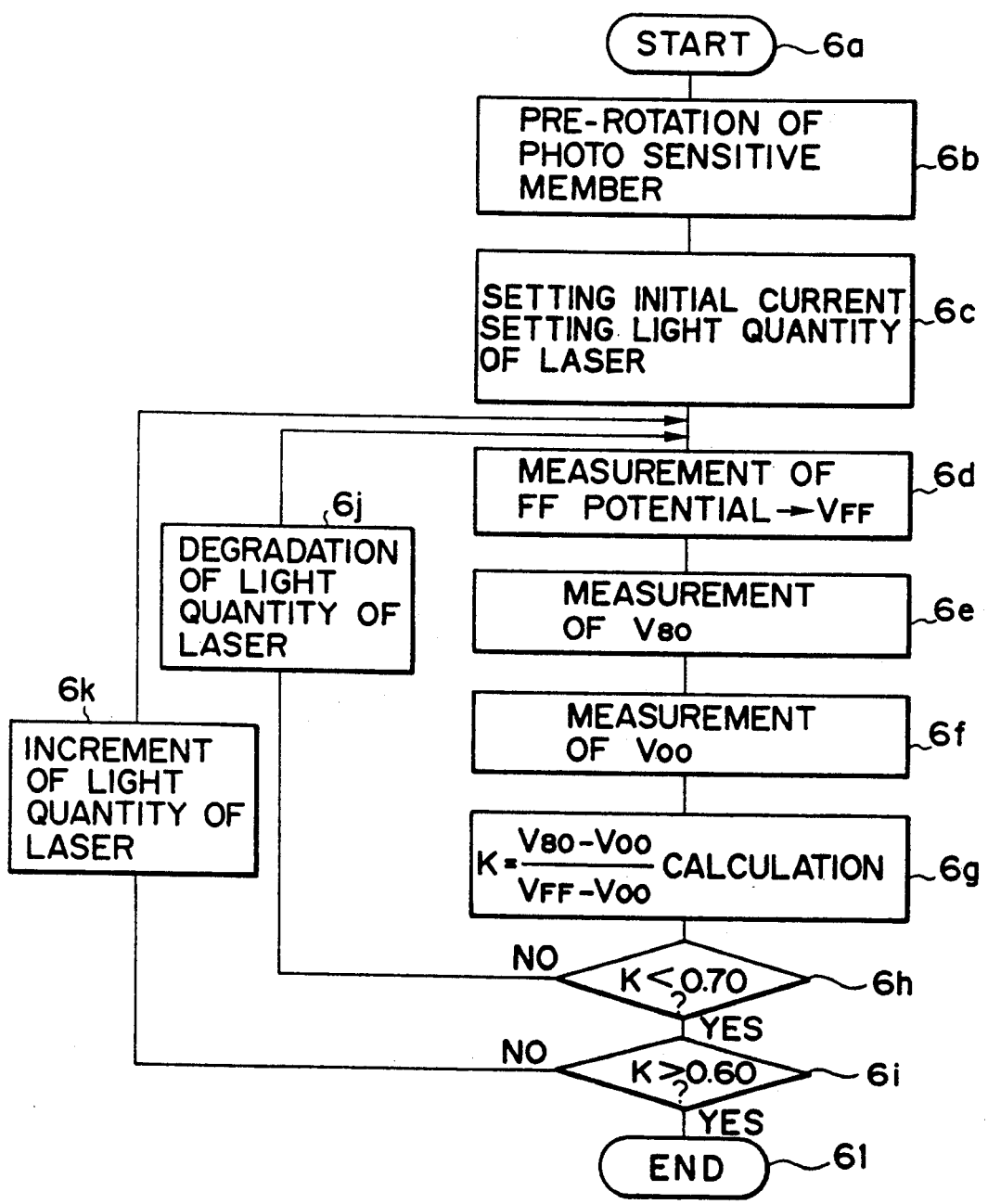
FIGS. 6 and 7 are flow charts illustrating control routines according to the invention.
Figure 7:
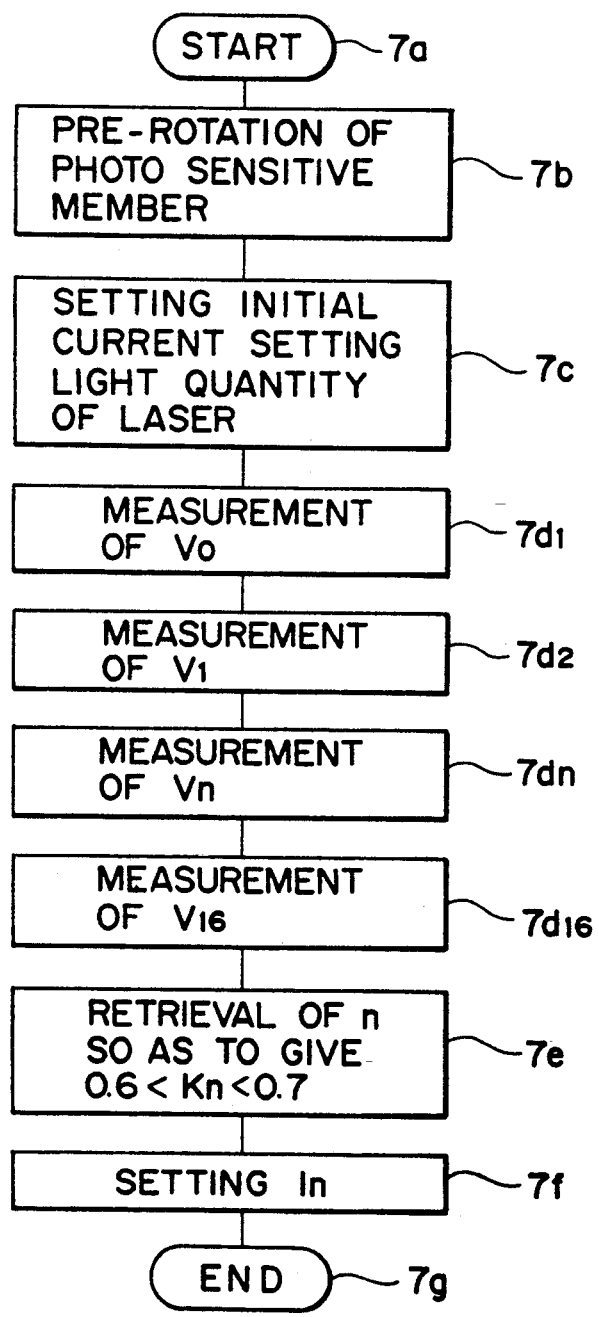

FIG. 1 is a schematic representation of an image forming apparatus (hereinafter referred to as laser printer) as one embodiment of the invention, FIG. 2 is a block diagram showing an image processing unit shown in FIG. 1, FIG. 3 is a waveform chart showing timings of various signals appearing in various parts of the image processing unit shown in FIG. 2, FIG. 4 is a graph showing a potential versus exposure amount characteristic of a photosensitive medium in the same embodiment, FIG. 5 is a graph showing a potential versus image signal characteristic of the same photosensitive medium, FIG. 6 is a flow chart illustrating a control operation of the same embodiment, and FIG. 7 is a flow chart illustrating a separate control operation of the same embodiment. In FIG. 1, parts like or corresponding to those in the prior art example are designated by like reference numerals and symbols, while omitting their description again.

The individual components will first be described.

Reference numeral 20 designates an image processing unit, which receives digital image data 22 and reference clock signal 23 and provides binary encoded image data obtained as a result of substantially continuous pulse width modulation according to image density (to be described later in detail). Binary encoded image data 21 is supplied to laser driving unit 24, which controls the laser beam intensity, thus driving laser 4 to produce a modulated laser beam.

The laser beam from laser 4, as described before in connection with the prior art example, scans photosensitive medium 1 to form a two-dimensional electrostatic latent image thereon with rotation thereof in the direction of arrow 2. The electrostatic latent image is developed by developing unit 5 to be transferred to transfer sheet 7. Residual tonor without being transferred is collected by cleaner 10. After the transfer, transfer sheet 7 is separated from the photosensitive drum and fed past fixing unit 9 before being discharged.

Reference numeral 25 designates a potential sensor, which is located in the proximity of the surface of photosensitive medium 1 at a position after a position of exposure of medium 1 to laser beam and detects the potential of electrostatic latent image on the photosensitive medium surface. The output of potential sensor 25 is supplied to potential measurement unit 26 for measurement of potential. The output of potential sensor 25 is an analog signal and is converted by A/D converter 27 into a digital signal which is supplied to control unit 28.

Control unit 28 includes a microcomputer (hereinafter referred to as CPU), a ROM which stores control programs and data of the CPU, a RAM as word area of the CPU, as well as various I/O ports and A/D converters. It controls the entire laser printer and also provides command signals as analog signals to various controlled units to be described later.

Reference numeral 29 designates a high voltage control unit for controlling charging current of charger 3, and 30 a high voltage control unit for controlling a grid bias voltage applied to charger 3. Reference numeral 31 designates a developing bias control unit for controlling a developing bias voltage applied to developing unit 5.

The operation of the image processing unit shown in FIG. 1 will now be described with reference to FIGS. 2 and 3.

FIG. 2 is a block diagram showing the detailed construction of image processing unit 20 shown in FIG. 1, and FIG. 3 shows timings of signals appearing in various parts shown in FIG. 2.

Referring to the block diagram of FIG. 2, digital image data 22 is converted by D/A converter 202 into analog image signal 203 to be supplied to one input terminal of comparator 211. Timing signal generator 207 produces pixel clock 204 and screen clock 208 according to reference clock signal 23 supplied to timing signal generator 207 and provides screen clock 208 to pattern signal generator 209 and pixel clock 204 to D/A converter 202. Pattern signal generator 209 produces pattern signal 210 on the basis of screen clock 208, signal 210 being supplied to the other input terminal of comparator 211.

Referring to the timing chart of FIG. 3, digital image data 22 is supplied in synchronism to pixel clock 204, and D/A converter 202 supplies analog image signal 203 to one input terminal of comparator 211 in synchronism to pixel clock 204. Screen clock 208 is a clock signal having an integral multiple of the cycle period of pixel clock 204 and defines the cycle period of pattern signal 210, which is, for instance, a triangular wave as shown.

Analog image signal 203 and pattern signal 210 supplied to comparator 211 are compared in comparator 211. As a result, binary encoded image data 21 is produced, which is "0" of analog image signal 203 is greater and "1" otherwise.

In the case of timings shown in FIG. 3, screen clock 208 has double the cycle period of pixel clock 204. In this case, binary encoded image data 21 has a pulse waveform obtained as a result of pulse modulation according to pattern signal 210 as digital image signal 22 is changes stepwise from 00 (white) to hexadecimal FF (black). Variation of the amplitude of pattern signal 210, which is a triangular wave for instance, permits variation of the relation between the input level of digital image data 22 and pulse width of binary encoded image data 21.

Binary encoded image data 21 obtained as a result of pulse width modulation in the above way, is supplied to laser driving unit 24 and converted in unit 24 into a current waveform having a pulse width corresponding to the input data for driving semiconductor laser 4.

It will be seen from the above description that the average exposure amount of the photosensitive medium is increased with increasing image signal toward FF (black) and hence increasing semiconductor laser "on" time per pixel.

Further, current $I_{on}$ when semiconductor laser 4 shown in FIG. 1 is "on", can be varied according to a command signal from control unit 28. In other words, the laser beam intensity is increased by increasing current $I_{on}$ and is reduced by reducing $I_{on}$. That is, the average exposure amount of the photosensitive medium is increased with increasing $I_{on}$, and this means that a desired exposure amount can be obtained through control of the laser beam intensity.

Now, the sensitivity of photosensitive medium and output image density characteristic will be described with reference to FIGS. 4 and 5.

The relation between the potential or charge on and sensitivity or exposure amount of photosensitive medium 1 (FIG. 1) (i.e., V-E characteristic) varies with individual photosensitive media, and even with identical photosensitive media it varies depending on conditions and time of its use. Further, semiconductor laser drive current and apparent photosensitive medium sensitivity such as image data and photosensitive medium potential vary with variation of current-intensity characteristic of semiconductor laser 4 and transmittivity of focusing optical system.

FIG. 4 shows the V-E characteristic of photosensitive medium. The ordinate is taken for the potential, and the abscissa for the exposure amount. Labeled Vd is a potential in the case of absence of exposure. This potential is equal to the initial charging potential by charger 3. With increasing exposure amount the charge is reduced, and hence the absolute value of potential is reduced. This relation is represented by curve Y. While curve Y is linear over a low exposure amount range, it shows saturation in a high exposure amount range.

In FIG. 4, the average exposure amount of and potential of the photosensitive medium are respectively $P_{FF}$ and $V_{FF}$ when the digital image signal is FF (black) and are respectively $P_{00}$ and $V_{00}$ when the image signal is 00 (white). With exposure amount $P_{FF}$ at point A (FIG. 4), potential changes between $V_{00}$ and $V_{FF}$ for a corresponding image signal range between 00 (white) and FF (black) are as shown by curve a in FIG. 5. With exposure amount $P_{FF}$ at point B (FIG. 4), the potential versus image signal characteristic is represented by curve b in FIG. 5. As is seen from curves a and b, even if the output density at $V_{00}$ and $V_{FF}$ are constant irrespective of $P_{FF}$, the density varies for intermediate image signals, and curve b has a higher $\gamma$ value (i.e., $\tan\theta$ or difference in the vertical direction divided by difference in the horizontal direction) and leads to cruch in a high density range.

Further, even with the same exposure amount of $P_{FF}$, sensitivity variation of individual photosensitive media leads to characteristic variation like that shown in FIG. 5.

In this embodiment, the laser drive current is determined such that linearity is approached by variation of the photosensitive medium potential corresponding to exposure amount variation due to variation of the image signal.

Now, light amount control will be described on the basis of the photosensitive medium sensitivity and output image density characteristic described above with reference to the flow charts of FIGS. 6 and 7.

FIGS. 6 and 7 show flow charts of light amount control routine programs stored in ROM of control unit 28 (FIG. 1).

Referring to FIG. 6, when the light amount control is started in step 6a, step 6b is executed, in which photosensitive medium is pre-rotated in the direction of arrow 2 for erasing residual potential. In subsequent step 6c, initial charging current of charger and initial laser drive current are set. In subsequent steps 6d to 6f, potential sensor 25 measures average potentials $V_{FF}$, $V_{80}$ and $V_{00}$ of photosensitive medium corresponding to predetermined exposures FF (black), 80 (gray) and 00 (white) among pulse width modulation laser exposures according to binary encoded image data (FIG. 2) obtained in image processing unit 20 from the respective preset laser bean intensities noted above.

In subsequent step 6g, shape coefficient K is calculated from measured values of $V_{FF}$, $V_{80}$ and $V_{00}$ obtained in steps 6d to 6f.

$$K = \frac{V_{00} - V_{80}}{V_{00} - V_{FF}}$$

The value of K represents the ratio of the potential drop for an intermediate image density and maximum potential drop between OO (white) and FF (black). With a usual photosensor, K approaches 0.5 if the potential-exposure characteristic is linear while it approaches unity if the characteristic is non-linear (FIG. 5). Desired value $K_0$ of the shape coefficient is set to 0.6 to 0.7. In this case, the lower limit is set in order to reduce shape coefficient K so as to obtain linearity while preventing the exposure amount from being set to be excessively small by excessively demanding the linearity.

In subsequent steps 6h and 6i, the value of shape coefficient obtained in step 6g is compared to desired value $K_0$, for instance 0.6 to 0.7. If the value of K calculated from the measurement is greater than the desired value range, the routine goes to step 6j to reduce the laser drive current to a predetermined extent so as to reduce the laser beam intensity and then goes back to step 6d. If coefficient K is less than the desired value range, the routine goes to step 6k to increase the laser drive current to a predetermined extent and then goes back to step 6d. If it is determined that coefficient K is in the desired value range (i.e., 0.6 to 0.7 in the instant case), it is determined that adequate linearity is obtained, and the routine goes to step 6l to bring an end to the exposure control operation.

In the above case, the drive current is changed every time the measurement of $V_{FF}$, $V_{80}$ and $V_{00}$ is effected. However, it is possible to obtain the same results through pulse width control. FIG. 7 shows a control flow chart in case of the pulse width control.

Referring to FIG. 7, steps 7a to 7c are like respective steps 6a to 6c in FIG. 6. In steps $7d_1$ to $7d_{16}$ (i.e., a total of 16 steps), the pulse width for turn-on of laser 4 is changed in each step to effect exposure of photosensitive medium 1, and potential is measured in each step and stored in RAM of control unit 28. For example, in step $7d_1$ the pulse width for turn-on of laser 4 is set to 0, and potential $V_0$ of zero exposure is measure and stored in RAM. Subsequently, the pulse width is increased to a predetermined extent, and in step $7d_2$ potential $V_{16}$ is measured again. Then, the average exposure amount on the photosensor is set such that it is increased linearly according to the pulse width (FIG. 5). In this way, up to potential $V_{16}$ in step $7d_{16}$ is measured and stored in RAM. In subsequent step 7e, the following calculation is performed with respect to potential data $V_0$ to $V_{16}$ stored in RAM.

$$K_n = \frac{V_{n12} - V_0}{V_n - V_0}$$

where n = 2, 3, ..., 26

The value of n is obtained, with which the value of $K_n$ is a desired value, for instance 0.6 to 0.7, and preliminarily obtained laser drive current $I_n$ is set, with which exposure amount P with n-th pulse width in steps $7d_1$ to $7d_{16}$ is equal to maximum exposure amount $P_{FF}$ at the time of actual exposure to image (step 7f). The control operation is ended in step 7g.

It is further possible to obtain voltage measurement without pulse width control but by changing the sole laser drive current.

As has been shown, with this embodiment it is possible to obtain image output having stable gradation irrespective of photosensitive medium sensitivity changes by determining the potential-exposure characteristic and obtaining an exposure condition such as to approximate a linear characteristic.

Now, a different embodiment of the invention will be described, which permits selection of an exposure energy range suited for the characteristic of photosensitive medium and selection of optimum liquid quantity in the selected range.

Figure 8:
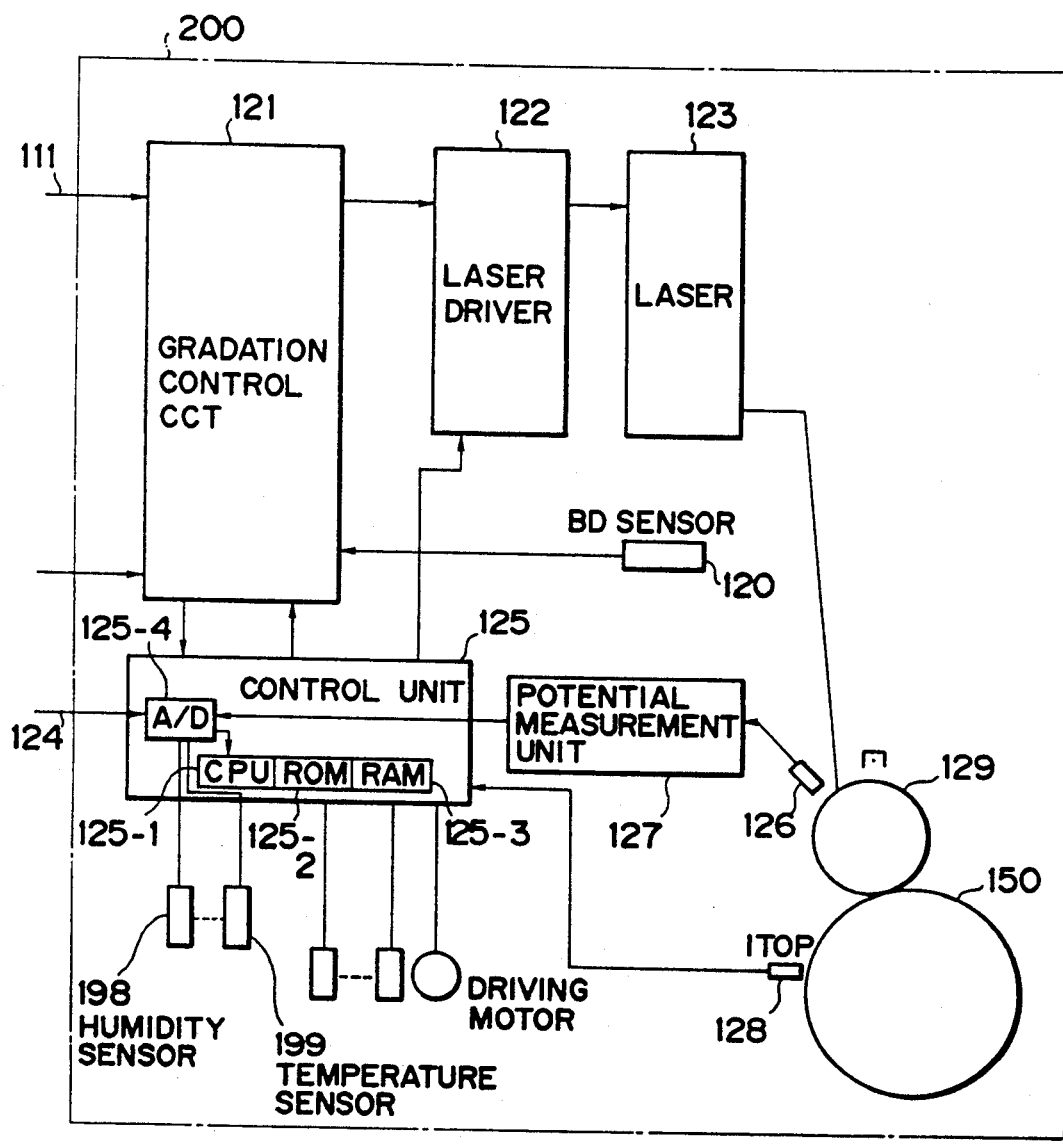
FIG. 8 is a schematic representation of a color image forming apparatus as second embodiment of the invention.

FIG. 8 is a schematic representation of a color copier as this embodiment.

Image data 111 provided from a leader unit (not shown) is supplied to gradation control circuit 121 of printer unit 200. Gradation control circuit 121 has a function of synchronizing image clocks of the reader unit and printer unit 200, these clocks having different rates, and also a function of providing for correspondence between image data and color reproduction density of printer unit 200. Output data from gradation control circuit 121 is supplied to laser driver 122 to drive semiconductor laser 123 for image formation.

Control unit 125 of printer unit 200, which communicates with the reader unit via communication control line 124, includes control elements of unit 200. Reference numeral 126 designates a potential sensor for detecting charge on photosensitive medium 129, and 127 a potential measurement unit for converting the output from potential sensor 126 into a digital signal which is supplied to control unit 125. Potential data supplied to control unit 125 is read out by CPU 125-1 in control unit 125 to be used for control. A signal from sensor 128 for detecting an image end signal (ITOP) is supplied to control unit 125 for controlling the printing operation. Temperature and humidity sensors 199 and 198 are supplied through A/D converter 125-4 to control unit 125 for compensation for development characteristics. Relative humidity AH is the ratio of steam to saturated steam air at each temperature and is given as $$\Delta H = f(T, H)$$

where T represents the temperature, and H the relative humidity sensor value. The function f is usually expressed as a cubic equation. T and H are provided as outputs of temperature and relative humidity sensors 199 and 198, and these two outputs are A/D converted in A/D converter 125-4 of the control unit for calculation with resultant digital data to obtain the relative humidity.

Control for determining the charger grid bias voltage is performed according to the relative humidity thus obtained.

In ROM 125-3 operation programs are stored, and RAM 125-4 is used as working area in the operation of CPU 125-1.

Figure 9:
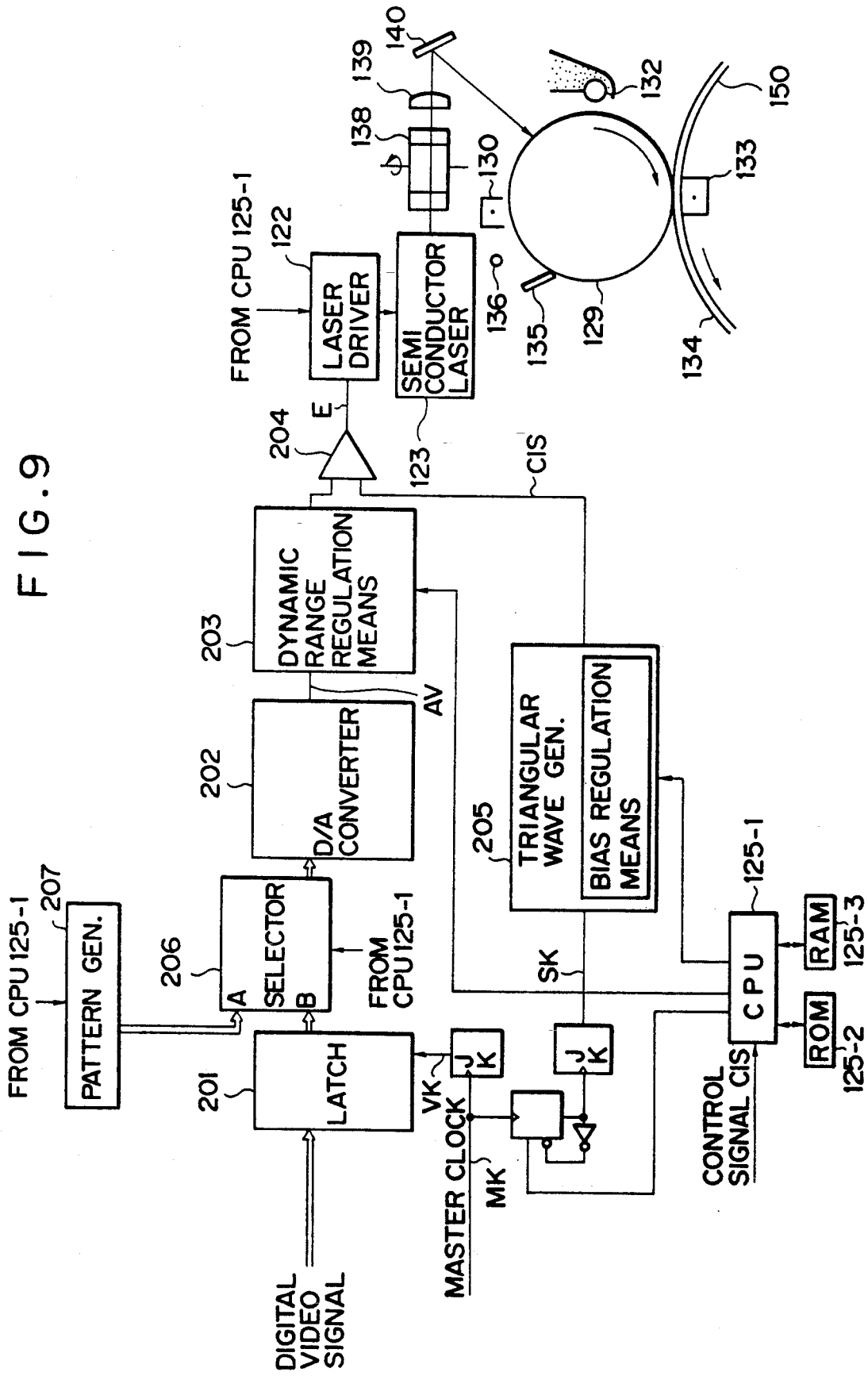
FIG. 9 is a detailed schematic representation of the color image forming apparatus shown in FIG. 8.

FIG. 9 shows the construction of FIG. 8 in greater detail. Reference numeral 129 designates an electrophotographic photosensitive drum rotated in the direction of arrow. Photosensitive medium 129 is first uniformly pre-charged by charger 130, and then it is exposed by being scanned with laser beam 131, which is obtained by on-off modulation according to a modulating signal, in a direction perpendicular to the direction of its rotation. As a result, an electrostatic latent image is formed on photosensitive medium 129, and it is then developed by developing unit 132 to obtain a visible image. Although not shown, this embodiment includes four developing units for respective colors Y, M, C and $B_K$.

The visible tonor image formed on photosensitive medium 129 is transferred by transfer charger 133 onto transfer medium 134 held on transfer drum 150, and then it is fixed by a fixing unit (not shown). Meanwhile, residual tonor remaining on photosensitive medium 129 after transfer is removed by cleaning unit 135. Subsequently, residual charge remaining on photosensitive medium 129 is removed by removal light from lamp 136. The above sequence of operations is repeated.

Digital video signal that is supplied is latched by latch 201 and then supplied to D/A converter 202 for conversion to analog video signal AV which is supplied to one input terminal of comparator 204. To the other input terminal of comparator 204 is supplied triangular wave signal CIS provided from triangular wave generator 205. Comparator 204 compares analog video signal AV and triangular wave signal CIS and provides pulse width modulation signal E, which is supplied to laser driver 122. According to signal E, semiconductor laser 123 is driven to provide laser beam 31, which is produced through on-off modulation according to modulation signal E.

Laser beam 131 provided from semiconductor laser 137 is scanned by scanner 138, which may be polygon mirror, galvano-mirror, etc. Reference numeral 139 designates a lens for focusing laser beam 131 as spot on photosensitive medium 129, and 140 a mirror for bending the optical path.

Reference numeral 203 designates dynamic range regulation means for regulating the dynamic range of the analog video signal provided in a predetermined check mode from the D/A converter according to signal from CPU 125-1. Reference numeral 208 designates bias regulation means for regulating the triangular wave bias provided in a predetermined check mode from triangular wave generator 205 according to signal from CPU 125-1.

Reference numeral 206 designates a selector for selecting signal supplied to D/A converter 202. More specifically, it selects either digital video signal latched in latch 201 or signal from pattern generator 207 according to signal from CPU 125-1. Pattern generator 207 generates data 00 and FF to be used in a laser power processing routine to be described later.

Figure 10:
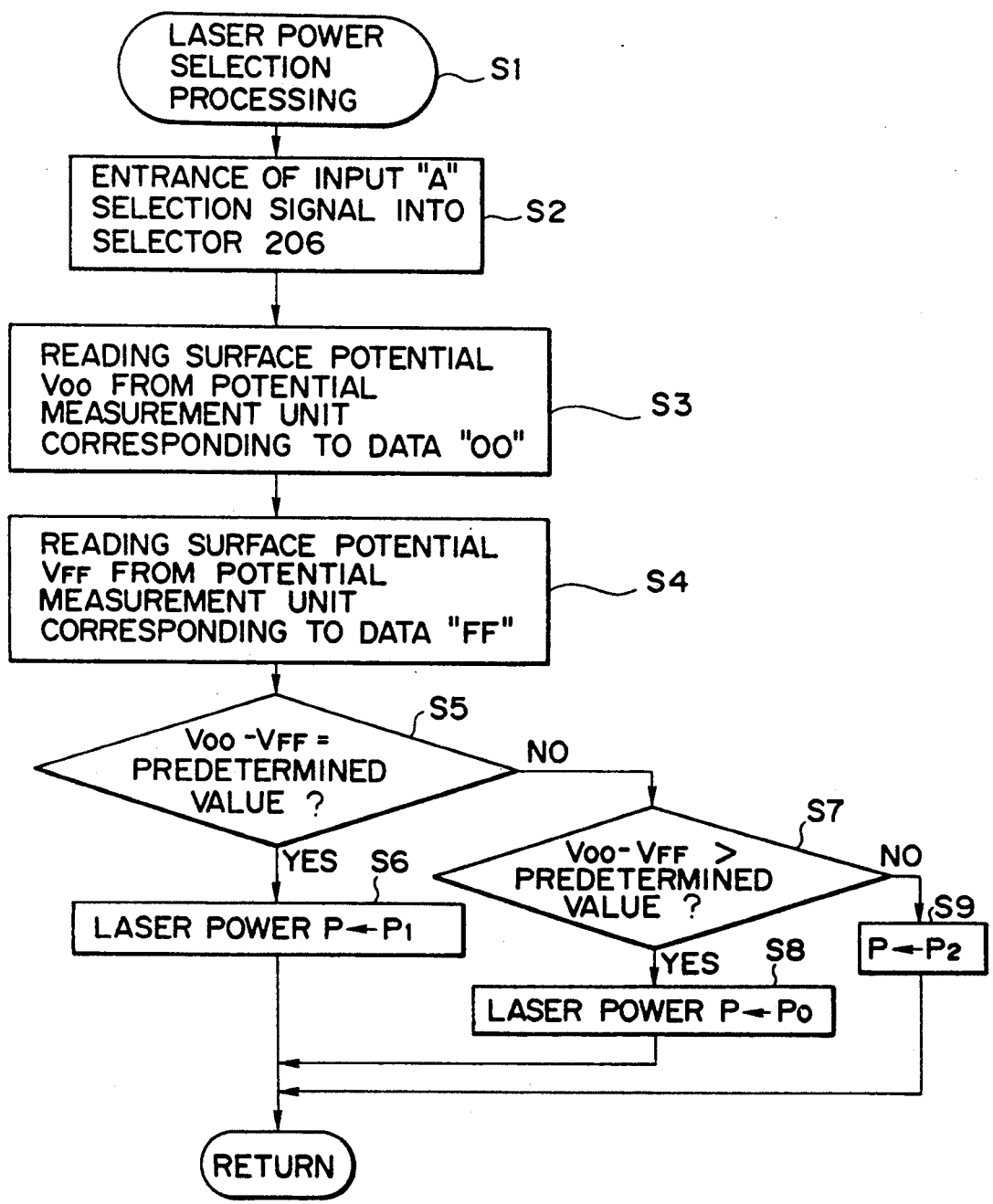
FIG. 10 is a flow chart illustrating a control routine for selecting an exposure energy range according to a contrast potential.

A laser power selection process will now be described. FIG. 10 is a flow chart illustrating the control routine for the processing. In the processing, an input "A" selection signal is supplied to selector 206 to drive pattern generator 207 so as to provide a predetermined pattern for reading the surface potential on photosensitive medium 129, and optimum laser power is selected according to the read-out value. The program of this routine is stored in ROM 125-3. Now, the processing will be described with reference to the flow chart.

In step S2, "A" input to selector 206 is selected to supply data from pattern generator 207 to D/A converter 202.

In step S3, surface potential $V_{00}$ on photosensitive medium 129 due to the provided laser beam is read out through potential measurement unit 127 according to data, for instance $00^H$, from pattern generator 207. In step S4, surface potential $V_{FF}$ corresponding to hexadecimal data $FF^H$ is similarly read out. In steps S3 and S4, equal primary high voltage is provided.

In step S5, a check is done as to whether the difference between $V_{00}$ and $V_{FF}$ is a predetermined value. If the difference is the predetermined value, preset laser power level P is selected in step S7. If the former is greater than the latter, power level $P_1$ lower than $P_0$ is selected in step S8. If the former is less than the latter, power level $P_2$ higher than $P_1$ is selected in step S9.

Laser power levels $P_0, P_1, \ldots, P_n$ (n being an integer given as $n \geq 0$), and the selected power level can be obtained by varying the drive current of the laser driver.

A predetermined value of $V_{00}-V_{FF}$ is provided such that a desired potential contrast can be obtained by using level $P_1$.

With the characteristic of photosensitive medium selected in the laser power level selection processing as shown above and with laser power level $P_1$ selected to $P_1$, the laser power level is changed such as $P_1 \rightarrow P_2 \rightarrow P_3$ as the necessary potential contrast is varied with environmental variation. With laser power level $P_2$ selected in the processing the power level is changed such as $P_2 \rightarrow P_3 \rightarrow P_4 \ldots$ to attain stabilization of the image density and gradation.

Figure 11:
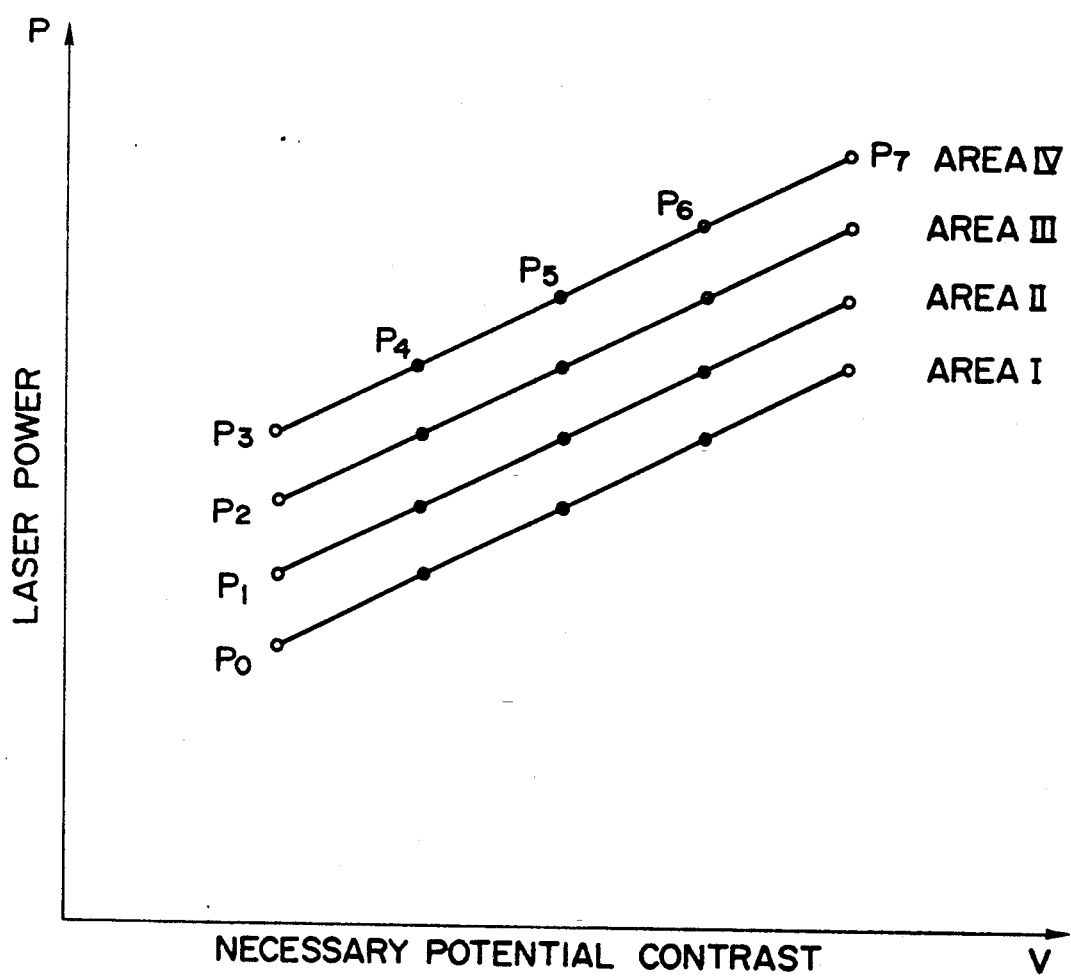
FIG. 11 is a graph showing an example of exposure energy ranges.

FIG. 11 shows an example of power level switching according to the necessary potential contrast. In this instance, n is 7.

If either one of power levels $P_0$ to $P_3$ is selected in the laser power level selection processing noted above, it means that it means that either one of ranges or areas I to IV is selected depending on the sensitivity characteristic of the pertaining photosensitive medium or optical efficiency of the exposure system or like factors.

If the relation between $P_n$ and $P_{n-1}$ is set such that the V-E characteristic (i.e., charging potential versus exposing energy characteristic) of the photosensitive medium is constant, it is possible to eliminate variation of the gradation due to power level switching.

The above processing can be carried out when the photosensitive medium or exposure system is replaced or at a certain interval.

As is shown, in this embodiment either one of preliminarily provided ranges or areas I to IV is selected in the laser power level selection processing (i.e., steps S5 to S9) depending on whether the value of $V_{00}-V_{FF} V_{FF}$ is the same or greater or less than a predetermined value.

As an alternative to the above processing, it is possible to have the values of $V_{00}-V_{FF}$ and primary high voltage predetermined and permit continuous laser power level such as to regulate $V_{00}-V_{FF}$ to a predetermined value using APC (automatic power control), for instance. In this case, once initial P is set, the power level is varied according to the necessary potential contrast while drawing the same curve as the power level curves shown in FIG. 11.

As has been shown above, by selecting an adequate exposure energy range for making up for fluctuations of the sensitivity characteristic of the photosensitive medium and optical efficiency of the exposure system it is possible to obtain the necessary potential contrast at all time for attaining image stabilization.

Now, a further embodiment will be described, in which a switching characteristic when switching the exposure amount according to the necessary potential contrast is provided with a hysteresis characteristic.

Figure 12:
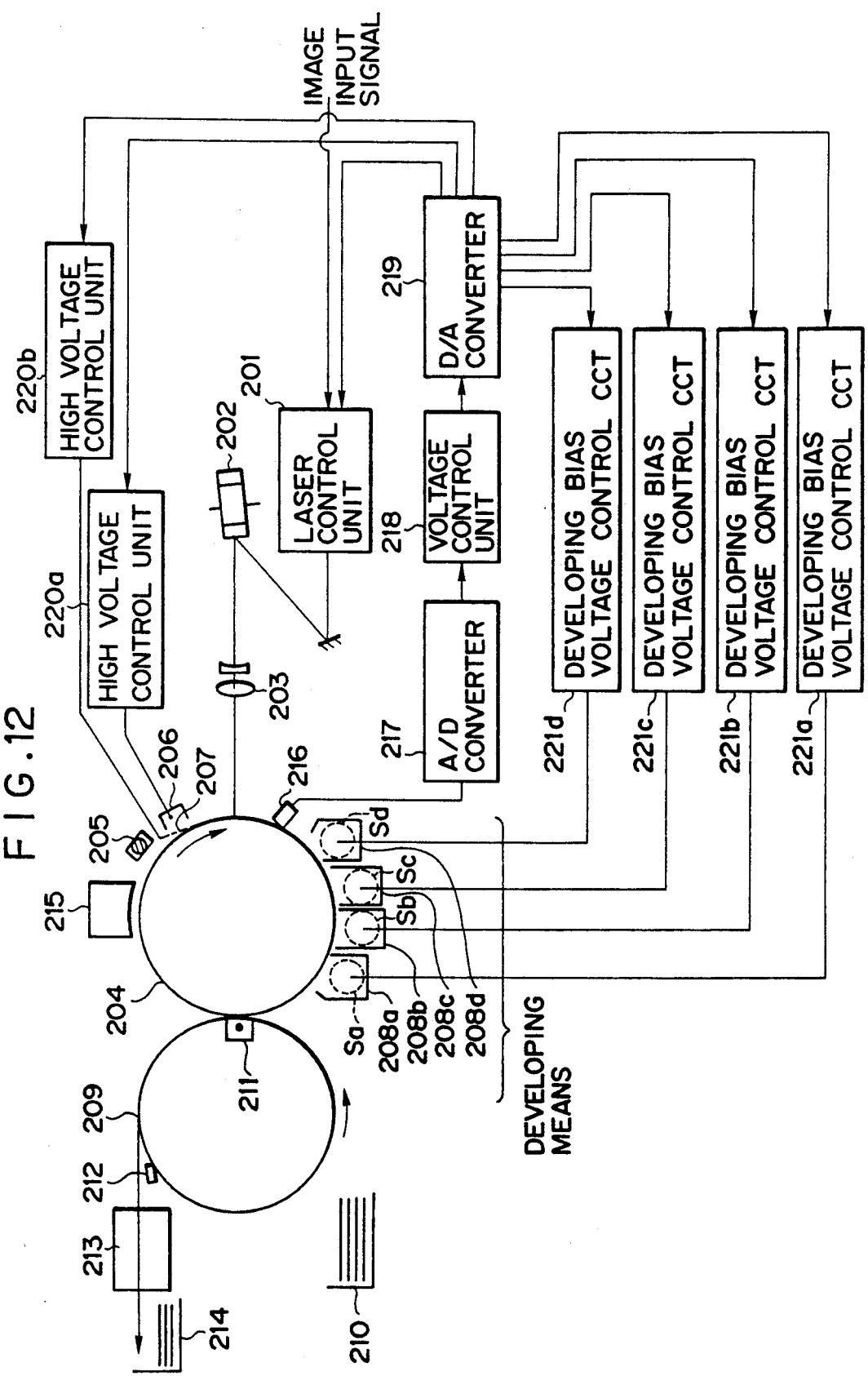
FIG. 12 is a schematic representation of a color image forming apparatus as third embodiment of the invention.

FIG. 12 is a schematic representation of a full-color image forming apparatus as embodiment of the invention. Laser control unit 201 produces a laser beam modulated according to an image input signal. Polygon mirror 202 having a plurality of rotary mirror surfaces is rotated at a constant speed by a scanner motor (not shown) for deflecting the incident laser beam. Reference numeral 203 is a focusing lens, which is an optical lens having a $f/\theta$ characteristic, and 204 a photosensitive drum as photosensitive medium, which is exposed to incident laser beam to form electrostatic latent image. Photosensitive drum 204 is rotated in the direction of arrow. Reference numeral 205 designates a discharging lamp for discharging the surface of photosensitive drum 204 to provide uniform potential thereon, 206 a corona charger for uniformly charging the surface of photosensitive drum 204, and 207 a grid electrode serving as control electrode when uniformly charging the surface of photosensitive drum 204. Developing means 208a to 206d develope electrostatic latent image formed on photosensitive drum 4 with respective developers (i.e., magenta, cyan, yellow and black developers) according to developing biases applied to respective developing sleeves Sa to Sd. Reference numeral 209 designates a transfer drum carrying a transfer sheet fed from transfer sheet cassette 210, 211 a transfer charger for transferring tonor image formed on photosensitive drum 204 onto the transfer sheet carried by transfer drum 209, 212 a separating pawl for separating transfer sheet after transfer of the individual color tonor images from transfer drum 209, 213 a fixing unit for fixing the tonor image transferred onto the transfer sheet, 214 a discharging tray, on which transfer sheets with fixed tonor images are stacked, 215 a cleaning unit for recovering residual tonor remaining on photosensitive drum 204, 216 a potential sensor provided in the proximity of photosensitive drum 4 at a position after the position of exposure to laser beam and serving to detect the latent image potential, 217 an A/D converter for converting analog output of potential sensor 216 into a digital output, and 218 voltage control unit consisting of a microcomputer including a RAM as data and control data memory means and a CPU as bias calculation means and control means. D/A converter 219 converts control data determined by voltage control unit 218 into analog data and provides control data to high voltage control unit 220a, which controls voltage applied to charger 206, and also to grid bias voltage control unit 220b, which controls grid bias voltage applied to grid electrode 7, and developing bias data to developing bias voltage control circuits 221a to 221d for controlling developing units 208a to 208d.

Figure 13:
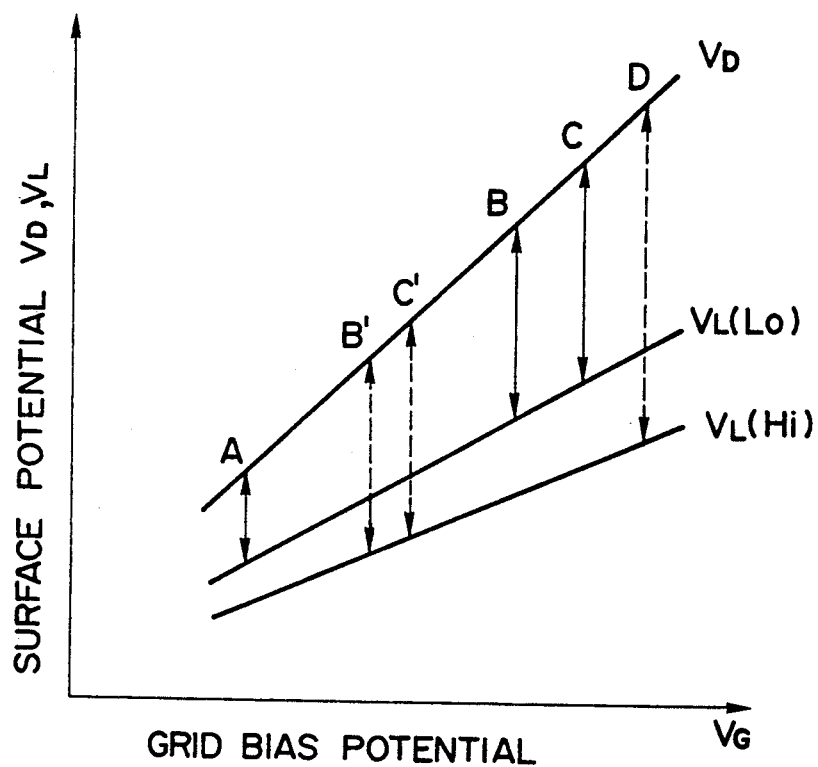
FIG. 13 is a graph showing the relation between surface potential on a photosensitive drum and grid bias potential of a corona charger.

Now, the operation of controlling the surface potential on photosensitive drum 204 will be described with reference to FIGS. 13 and 14.

In this embodiment, as in the prior art example, the setting of conditions for image formation is effected through control of the voltage applied to grid electrode 207 of corona charger 206 according to data obtained from potential sensor 216. Further, when a grid voltage control range is exceeded by image formation condition range, i.e., necessary potential contrast $V_D - V_L$, the amount of exposure of photosensitive drum 204 to laser beam is switched to change potential V on bright portion of the drum surface ($V_{L(Hi)} \leftarrow \rightarrow V_{L(Lo)}$), thus permitting a broader potential contrast range to be obtained. (FIG. 13).

However, when the exposure amount is switched, the image quality, particularly gradation, is varied due to influence of the V-E characteristic of photosensitive drum 204. Therefore, it is desired to dispense with the exposure amount switching as much as possible.

Figure 14:
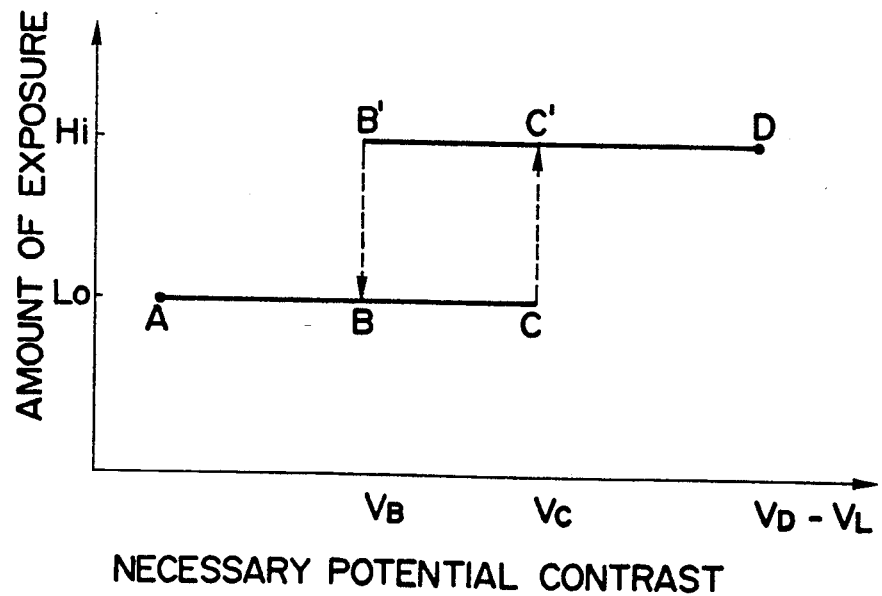
FIG. 14 is a graph showing the relation between exposure amount and necessary potential contrast on a photosensitive drum.

To solve this problem, in this embodiment, as shown in FIG. 14, the exposure amount switching is effected at different potential contrast in case when switching Lo over to Hi and in case when switching Hi over to Lo. More specifically, in this embodiment the switching of the exposure amount from the side of Lo over to the side of Hi is effected when necessary potential contrast $V_D - V_L$ becomes predetermined value $V_C$ (C C'), but the switching from the side of Hi over to the side of Lo is not effected upon reaching of value V but is effected only when lower value $V_B$ is reached (B' B). In other words, a hysteresis characteristic is provided to the characteristic of switching of the exposure amount according to necessary potential contrast $V_D - V_L$. When obtaining the necessary potential contrast of $V_C$ through such control, after switching of the exposure amount from Lo over to Hi the exposure amount is not switched upon reaching of $V_C$ by the potential contrast again but is switched when and only when the potential contrast is reduced to $V_B$ which is lower than $V_C$. Therefore, even when the potential contrast is varied slightly due to environmental variation, the exposure amount is not switched, thus permitting constant image quality to be maintained.

In the above embodiment the exposure amount is switched between two levels, but this is by no means limitative, and the invention is applicable to an apparatus permits switching of more than two levels as well.

Figure 15:
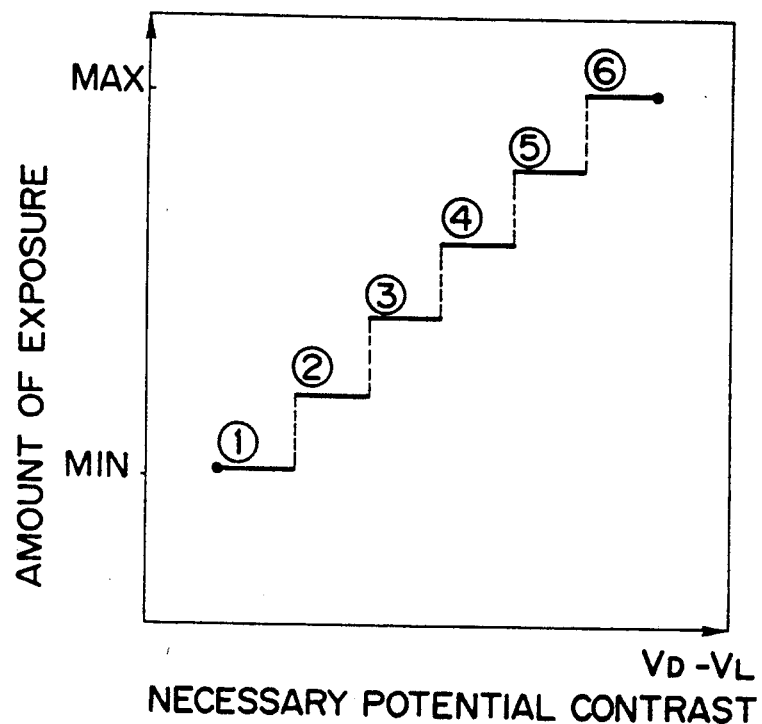
FIGS. 15 and 16 are graphs showing the relation between exposure amount and necessary potential contrast on a photosensitive drum for illustrating control operation of the embodiment in case when permitting multi-level switching of the exposure amount.

FIG. 15 is a graph showing exposure amount variation in an apparatus, in which the exposure amount is subject to switching among six levels according to necessary potential contrast $V_D - V_L$. By permitting such frequent exposure amount switching, the exposure amount change at the time of switching is reduced to alleviate variation of the regulation property accompanying the V-E characteristic of photosensitive drum 204. On the demerit side, however, the points of switching are increased, and the exposure amount is switched frequently even with slight environmental variations, thus resulting in degradation of the image quality.

Figure 16:
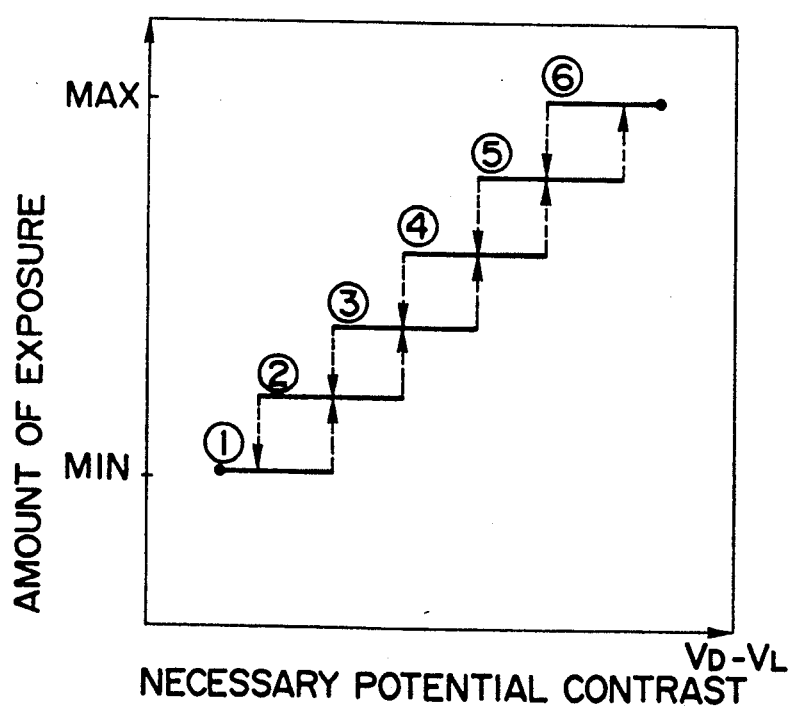

However, by controlling the exposure amount in the above method such that a hysteresis characteristic is provided at each point of switching as shown in FIG. 16, once the exposure amount is switched, constant exposure amount can be maintained unless a great environmental variation takes place. Therefore, by applying the invention to such apparatus, with which the gradation is subject to less change when switching the exposure amount, it is possible to obtain very high image quality.

The above switching of the exposure amount between two levels and among six levels is by no means limitative, and the invention is applicable to an apparatus, in which the exposure amount is switched among any number of different levels.

Now, a further embodiment will be described, in which an adequate one of a plurality of exposure energy ranges is selected according to the necessary potential contrast, and the exposure amount is switched among a plurality of levels in the selected exposure energy range with a hysteresis characteristic provided to the switching characteristic. The construction of apparatus of this embodiment is the same as shown in FIG. 12.

Figure 17:
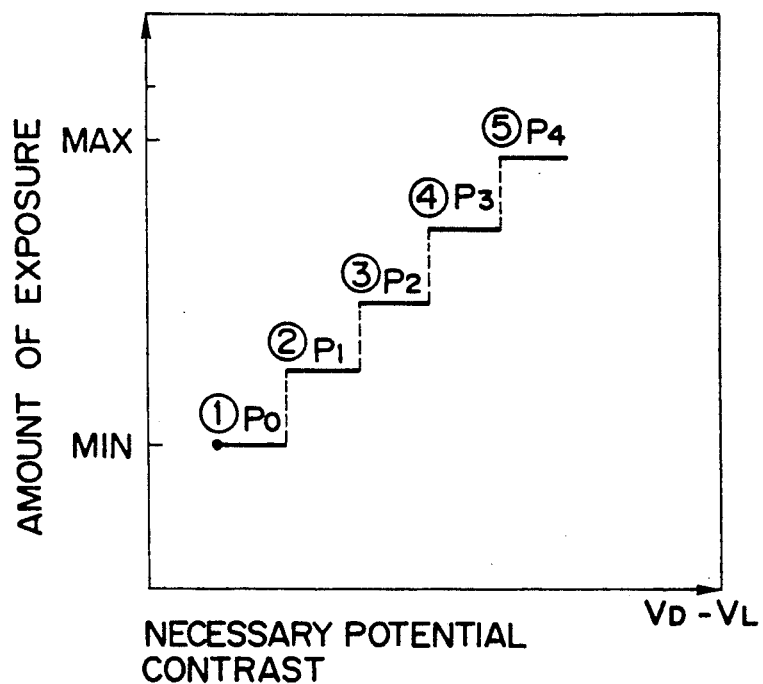
FIG. 17 is a graph showing the relation between exposure amount and necessary potential contrast.

FIG. 17 is a graph showing exposure amount variation of an apparatus, in which the exposure amount is switched among five levels according to necessary potential contrast $V_D - V_L$. With such frequent switching of the exposure amount, the exposure amount change at the time of switching is reduced to alleviate variation of the gradation accompanying changes in the V-E characteristic of photosensitive drum 204 as noted above.

Figure 18A:
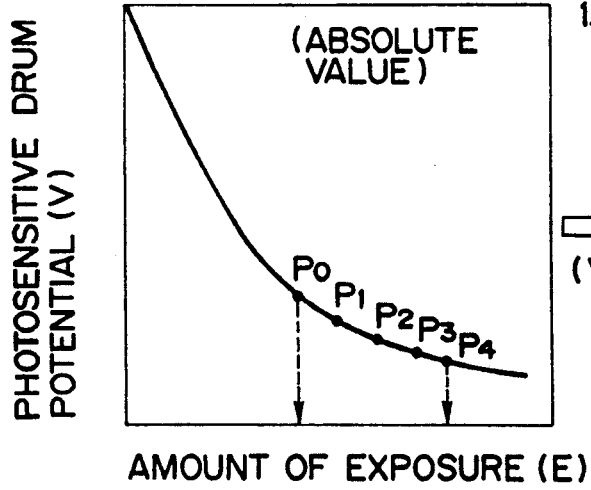
FIGS. 18A and 18B are graphs showing the relation between exposure amount and surface potential on photobetween sensitive drum.
Figure 18B:
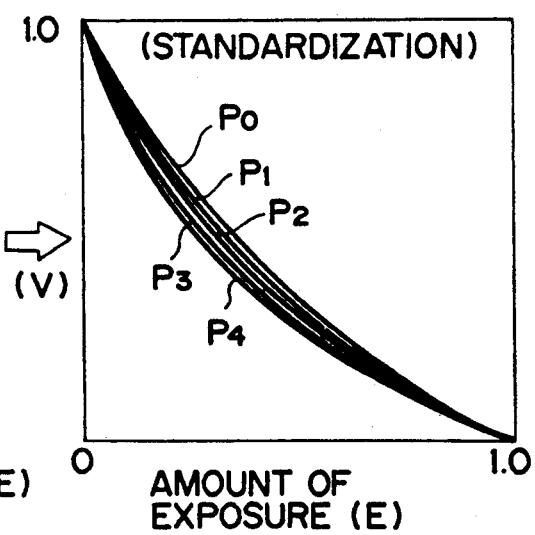

The variation of the gradation can be alleviated by reducing the exposure amount change to 20% or below. FIGS. 18A and 18B show V-E characteristic changes in case where the exposure amount is switched among five levels with a change of about 20%. Doing so permits considerable alleviation of the variation of the gradation at the time of switching, as is seen from FIG. 18B. The variation of the gradation at the time of switching can be substantially ignored if the change in the exposure amount is set to 10% or below.

While this embodiment has concerned switching of the exposure amount among five levels, this is by no means limitative, and sufficient effects are obtainable so long as the exposure amount can be switched among at least three levels.

As shown above, with control of the exposure amount switching such as to provide a hysteresis at each point of switching the frequency of switching can be greatly reduced, and variation of the gradation at the time of switching can be extremely reduced by increasing the number of switching levels and setting the change at each switching to be 20% or below.

From the above, if the exposure amount switching is controlled with a hysteresis provided at each point of switching, once the exposure amount is switched a constant exposure can be maintained unless great environmental variation takes place. By applying the invention to such apparatus, in which the gradation is subject to less variation at the time of switching of the exposure amount, therefore, it is possible to obtain very high image quality.

Further, this embodiment seeks to attain stabilization of image by permitting selection of an adequate laser power level range for compensation for fluctuations of the sensitivity characteristic of photosensitive medium and the optical efficiency of exposure system.

The photosensitive medium is subject to variations of its sensitivity characteristic due to difference among lots at the time of manufacture and variations of various parameters in long use, and also the optical system is subject to variations of its optical efficiency due to difference of individual machines and contamination.

Accordingly, it is sought to permit selection of a laser power level area or region in use by carrying out measurement and check as to whether the optical efficiency of the exposure system of the apparatus is satisfactory or not at present, whether the sensitivity characteristic of the photosensitive medium is quick or slow and whether a desired potential contrast is obtainable.

Figure 20:
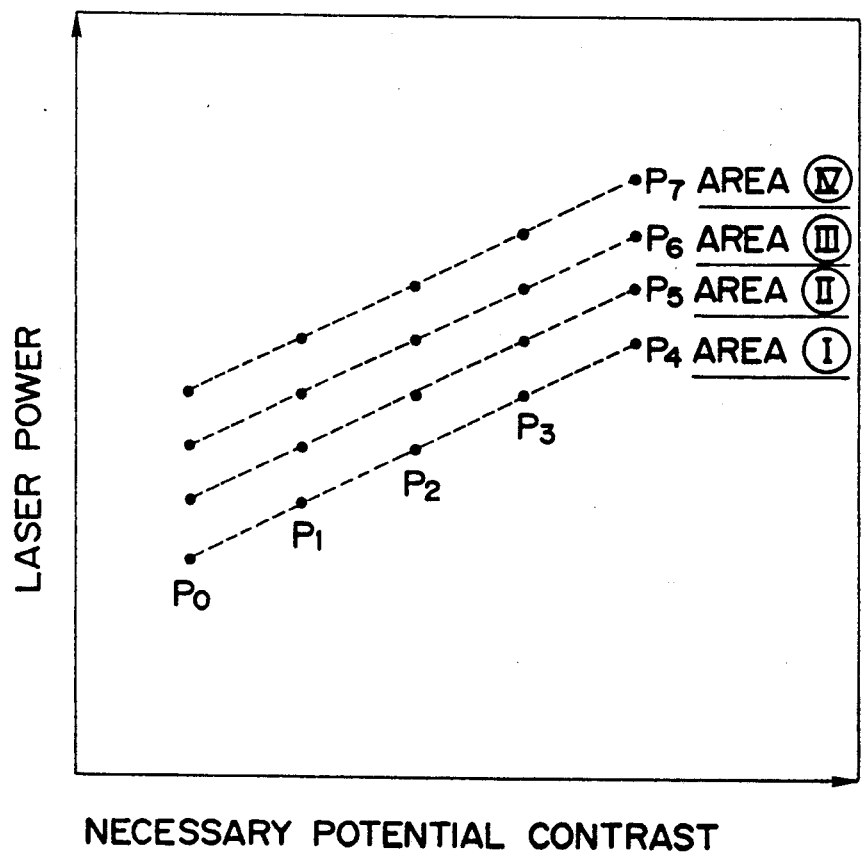
FIGS. 20 and 22 are graphs showing the relation between exposure energy range and necessary potential contrast.

FIG. 20 shows an example of laser power level areas or ranges plotted against the necessary potential contrast. The basic form is the five-level switching as shown in FIG. 17 ($P_0$ to $P_4$). To these levels, three further levels ($P_5$ to $P_7$) are added, thus providing five switching power levels $P_0$ to $P_4$ multiplied by four areas or regions I to IV.

More specifically, in case when the sensitivity characteristic of the photosensitive medium is quick or the optical efficiency of the exposure system is satisfactory, low power levels $P_0$ to $P_4$ in region I are used. In the converse case, high power levels $P_3$ to $P_7$ in region IV are used. In intermediate characteristic cases, either region II or III is used.

Figure 21:
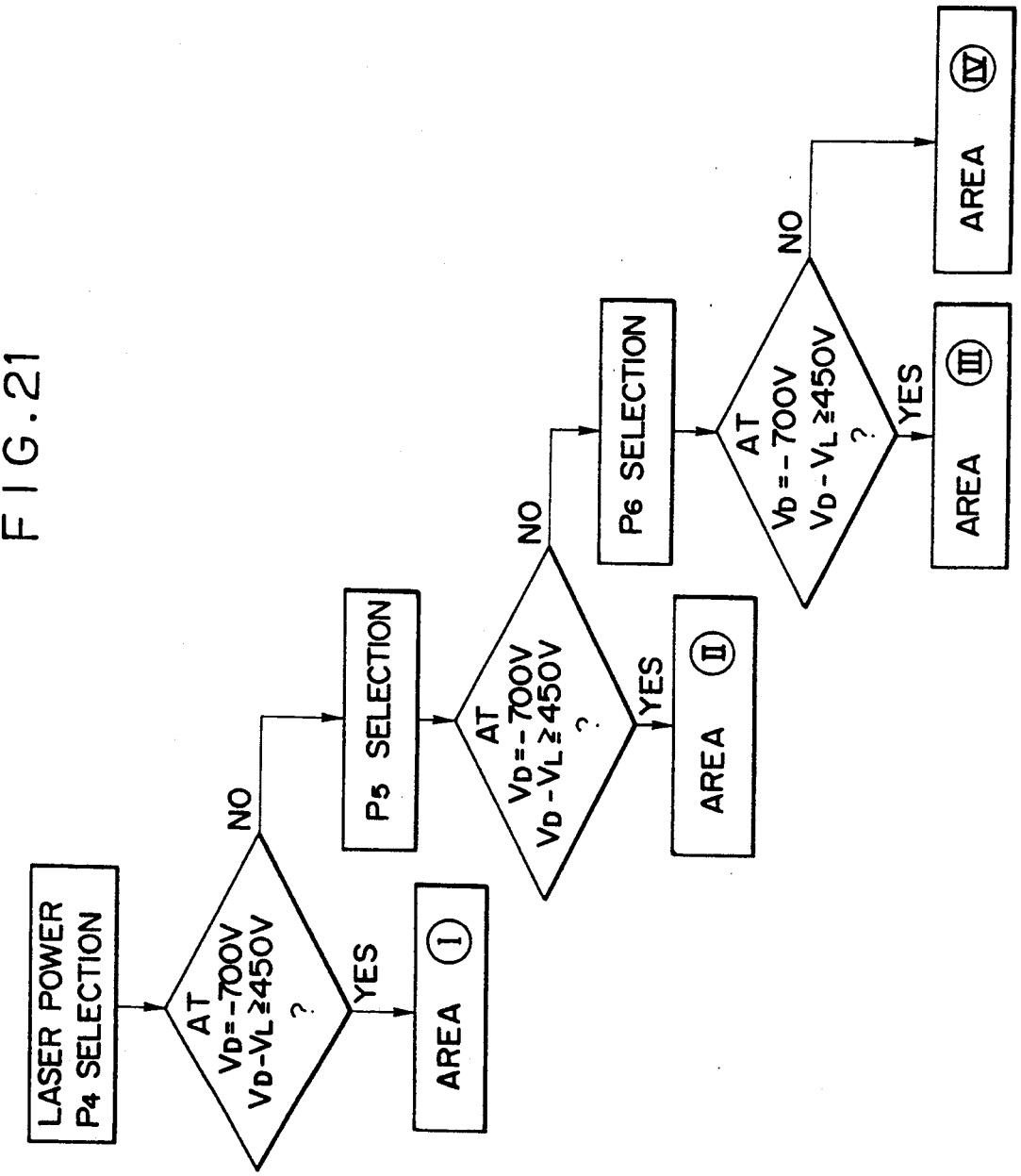
FIG. 21 is a flow chart illustrating a control operation for selecting an exposure energy range according to a potential contrast.

FIG. 21 shows a method of selection of region for use through sensitivity characteristic measurement.

Figure 19:
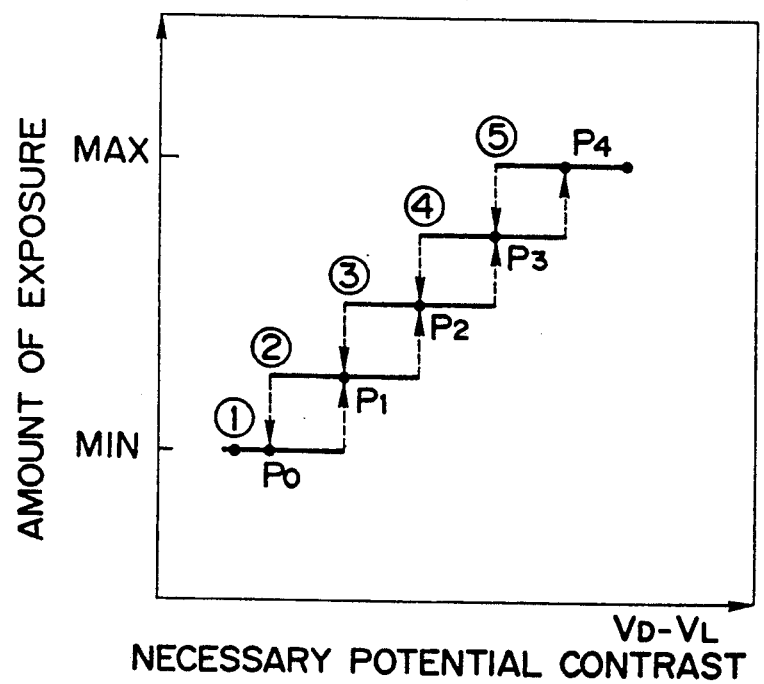
FIG. 19 is a graph showing the relation between exposure amount and necessary contrast potential in case where a hysteresis characteristic is provided for an exposure amount switching characteristic.
Figure 22:
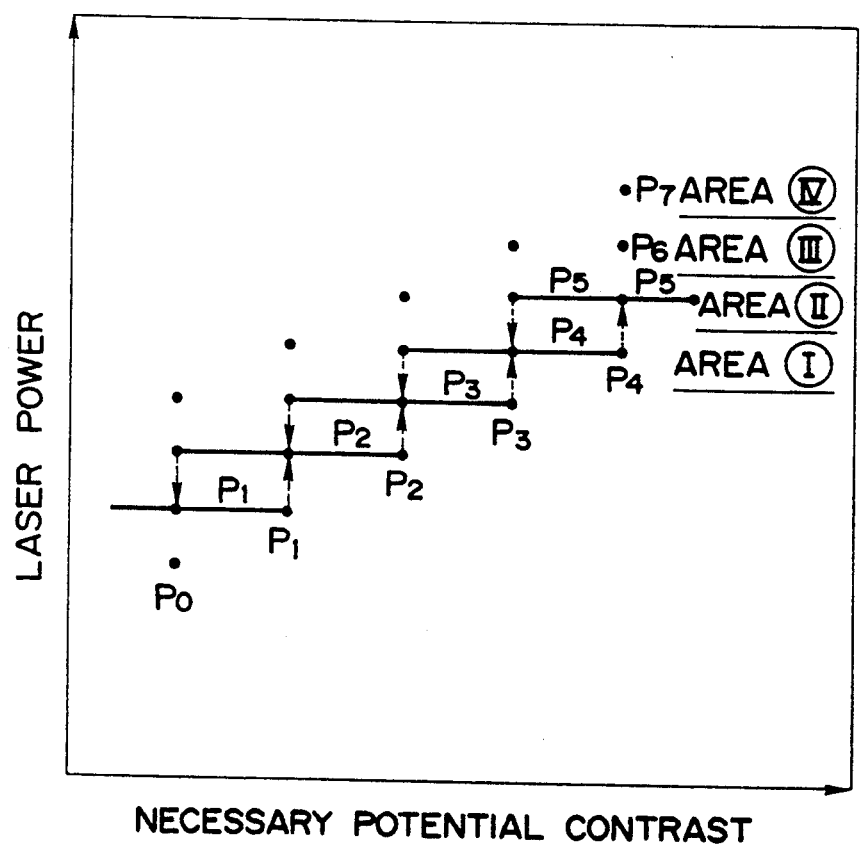

First, maximum power level $P_4$ in region I is selected, and a check as to whether a maximum value of necessary potential contrast $V_3 - V_L$ (for instance 450 V) is obtainable with certain dark portion potential $V_D$ (for instance $-700V$) is done using P in the aforementioned usual potential control mode. If the maximum value is obtainable, the exposure amount is adequate, and thus the region for use is determined to be region I. Otherwise, the exposure amount is insufficient. In this case, maximum power level $P_5$ in region II is selected, and similar measurement is performed. In this way, the laser power level region for use is determined. FIG. 22 shows a combination of a determined laser power level region for use and exposure amount switching system shown in FIG. 19. In this example, region II is selected for use, and five power levels $P_1$ to $P_5$ are capable of selection.

Now, a process from the laser power level switching to the photosensitive medium potential control and then image formation according to the invention will be described.

This embodiment also features use of an image forming apparatus, which performs pulse width modulation (PWM) of laser beam according to image data for image formation. Input image data has intermediate tone data of 256 steps from $00_H$ to $FF_H$ (in hexadecimal expression) and permits continuous tone expression from bright area (corresponding to data $00_H$) to dark area (corresponding to $FF_H$). When this is combined with the invention, high tonality images can be formed more stably.

Now, a process up to image formation in the image forming apparatus including the pulse width modulation unit as described above will be described with reference to FIGS. 23 and 24.

Figure 23:
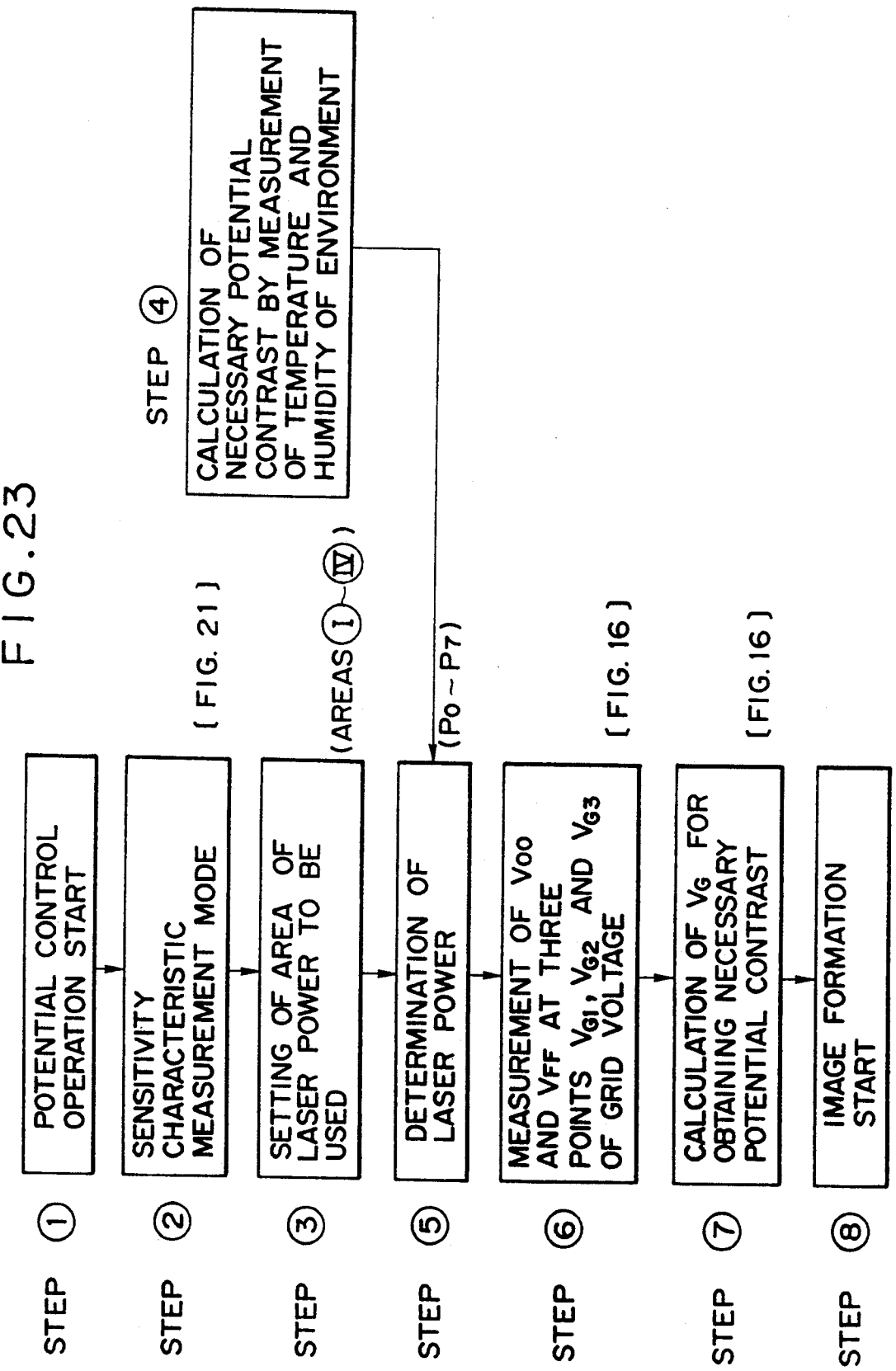
FIG. 23 is a flow chart illustrating a potential control routine.
Figure 24:
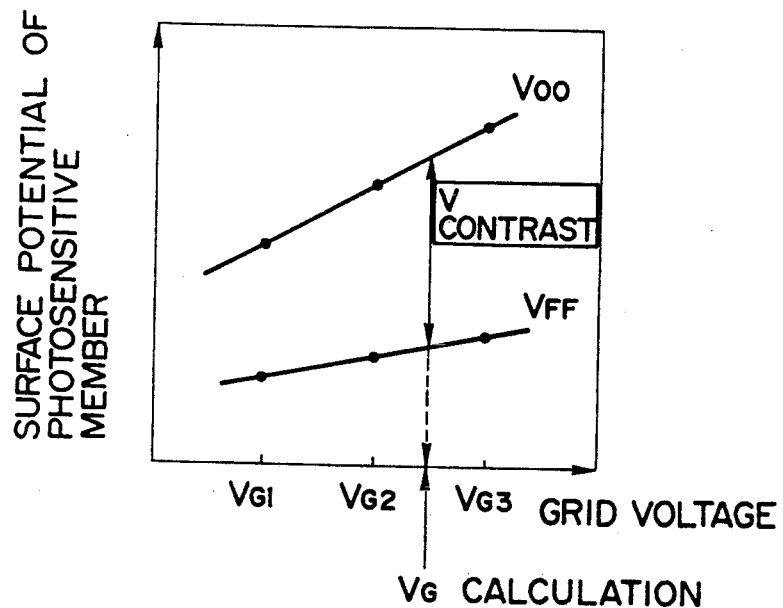
FIG. 24 is a graph showing the relation between surface potential and grid bias voltage of a charger.

FIG. 23 is a flow chart illustrating the routine of the process. After start of the potential control operation (step 1), the sensitivity characteristic of the photosensitive medium is performed as shown in FIG. 21 (step 2), and the laser power level area or region for use (regions I to III) is set (step 3). Then the potential contrast (V contrast) necessary for the photosensitive medium is calculated from the measurement of temperature and relative humidity inside and outside the apparatus (step 4). When the necessary potential contrast is calculated, the exposure amount is determined from the relation between power level and necessary potential contrast shown in FIG. 22 (either one of $P_1$ to $P_5$ in FIG. 22) (step 5). Using the determined power level, bright area potential corresponding to data $00_H$) and dark area potential ($V_{FF}$, corresponding to data $FF_H$) are measured with the grid bias voltage set to three different values ($V_{G-1}$ to $V_{G-3}$) (step 6). Then, grid bias voltage V for obtaining the necessary potential contrast (V contrast) is calculated from the relation between grid bias voltage and photosensitive medium surface potential as shown in FIG. 16 (step 7).

Actual image formation is started using the laser power level calculated in the above process and grid bias voltage $V_G$ (step 8).

When a certain time is passed or when an environmental variation has taken place, the potential control is started from step 4. Steps 2 and 3 may be executed at necessary intervals for photosensitive medium sensitivity changes or the like will not be brought about in a short period of time.

As has been shown, this embodiment permits selection of a laser beam power level area or region for use on the basis of measurement of the sensitivity characteristic of the photosensitive medium and multi-level power switching. Thus, variation of the image quality accompanying the switching of the exposure amount can be minimized to permit constant image quality to be maintained irrespective of any environmental variation.

Particularly, with a full-color image forming apparatus in which the gradation is important, it is possible to form high quality image free from color shift at all time.

Figure 25:
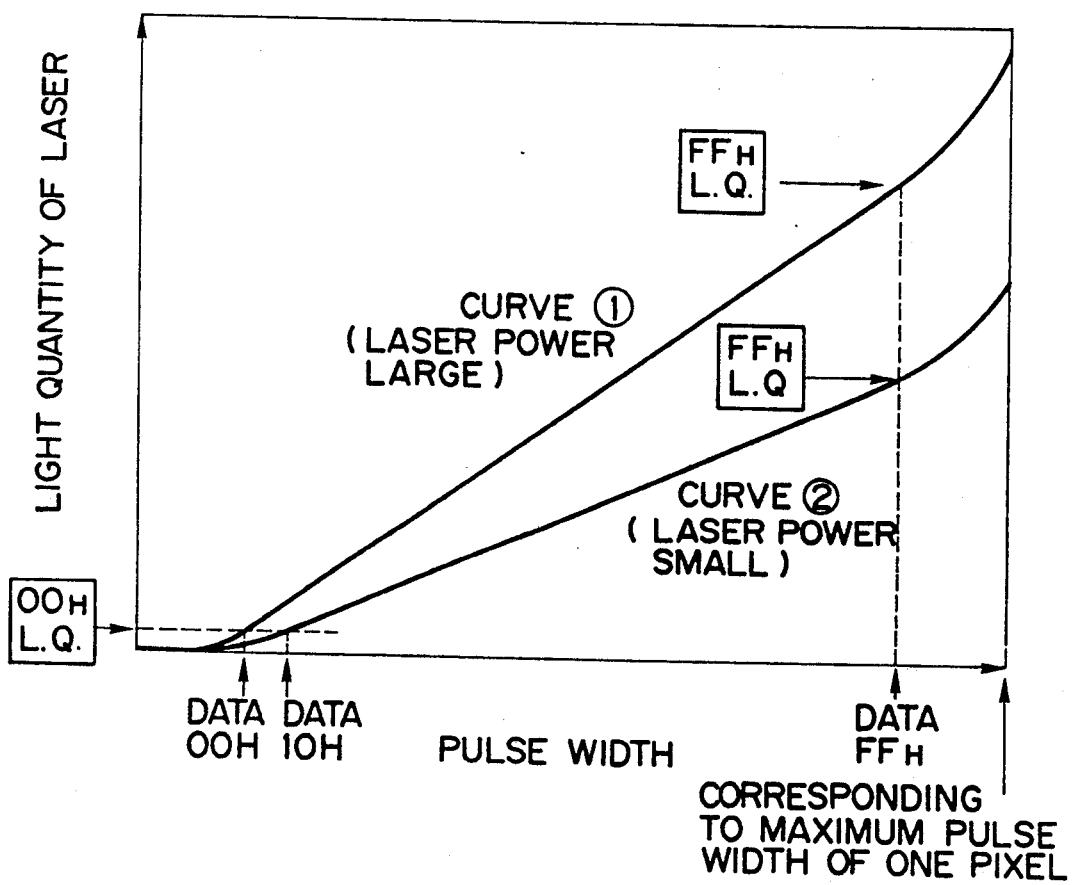
FIG. 25 is a graph showing the relation between light quantity of laser and pulse width.

Now, a further embodiment will be described, which permits further compensation of image signal supplied at the time of exposure amount switching.

Where image is recorded on photosensitive medium by varying the laser beam intensity through pulse width modulation (PWM) of a laser drive signal according to an input image signal, the relation between the laser beam intensity and pulse width provided as laser drive signal is as shown in FIG. 25.

In order to permit use of the linear portion of this characteristic curve as much as possible with levels $00_H$ (white area) to $FF_H$ (black area) (hexadecimal) of image data, minimum level $00_H$ is set to intensity, at which the curve turns to be linear, and maximum level $FF_H$ is set to intensity immediately before the point of deviation of the curve from the linearity.

However, when laser power level switching is done, the laser starts light emission from a point of exceeding of a predetermined threshold current. Therefore, the laser beam intensity is varied with the same pulse due to variation of the laser current. Therefore, in the relation between the laser beam intensity and pulse width given to the laser driver at the time of the laser power level switching, different linear regions result as shown by curves 1 and 2 in FIG. 25. Curve 1 results when the laser power level is high, while curve 2 results when the level is low.

In order to permit equal image density in correspondence to equal image data irrespective of laser power level changes, the pulse width has to be changed with laser power level switching. This means that it is necessary to provide pulse width modulation circuits corresponding in number to the number of laser power levels for switching.

However, even if a modulation circuit for two-level switching between high and low power levels, there are problems of complication of regulating operation and excessive change in exposure amount at the time of switching in case of two-level switching, resulting in extreme image quality changes with changes in the V-E characteristic of the photosensitive medium at the time of switching. The previous second to third embodiments are adapted to provide an increased number of exposure amounts for switching to reduce change in the exposure amount and hence change in the image quality at each switching, thus permitting stable and wide-range control of the potential contrast of the photosensitive medium. In this embodiment, image signal supplied at the time of exposure amount switching is compensated to provide superiority to the previous embodiments in the aspects of cost and regulation characters. The embodiment will now be described in detail.

Figure 27:
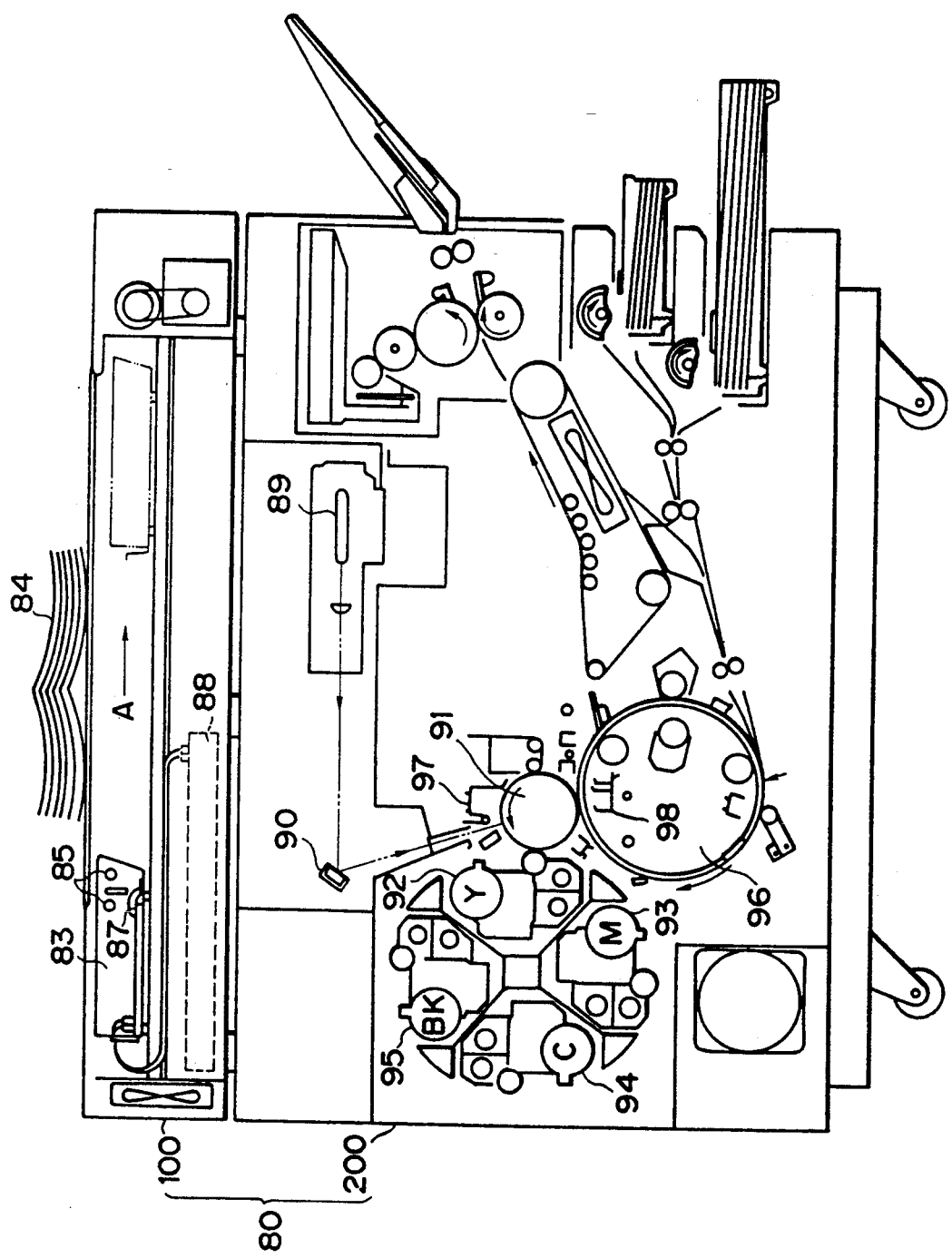
FIG. 27 is a sectional view showing a color copier embodying the invention.

FIG. 27 is a schematic view showing this embodiment of the invention applied to an image forming apparatus using a close contact type color CCD.

Copier 80 comprises reader unit 100 and printer unit 200. Original scanning unit 83 is moved in the direction of arrow A for scanning and reading image of original 84 on original table with exposure lamps 85 held "on". Light reflected from the original is led to a converging rod lens array (not shown) to be incident on close contact type color CCD sensor 87. CCD sensor 87 consists of 5 chips arranged in a staggered fashion and each consisting 1,024 pixels each 62.5 microns (1/16 mm) in size. Each pixel is divided into three divisions each of 15.5 microns by 62.5 microns, and C, G and Y filters are applied to the respective divisions.

The optical image incident on close contact type color CCD sensor 87 is converted into electric signal for each color. These electric signals are subjected to predetermined processing to be described later in image processing block 88 to obtain color-disassembly image electric signals, which are supplied to printer unit 200 for printing.

Color image data from reader unit 100 is subjected to PWM processing to ultimately drive the laser. A laser beam having been modulated in correspondence to image data is scanned at high speed by polygon mirror 89 rotated at high speed and reflected by mirror 90 for dot exposure of the surface of photosensitive drum 91 in correspondence to image. One horizontal line of laser beam scanning corresponds to one horizontal scan line of image and, in this embodiment, has a width of 1/16 mm. Meanwhile, photosensitive drum 91 is rotated at constant speed in the direction of arrow, and thus it is progressively exposed to plan image with the aforementioned laser beam scanning in the main scanning direction and its constant speed rotation in the auxiliary scanning direction. Prior to the exposure, it is uniformly precharged by charger 97, and latent image is formed with the exposure of the pre-charged photosensitive drum. Latent images obtained with given color signals are developed by corresponding color developing units 92 to 95.

Considering a first exposure scanning in color reader, for instance, a dot image of yellow component of the original image is formed as latent image on photosensitive drum 91 and developed by yellow developing unit 92. The resultant yellow tonor image is transferred by transfer charger 98 onto paper wound on transfer drum 96 at point of contact of photosensitive drum 91 and transfer drum 96 with each other. Like process is also performed for M (magenta), C (cyan) and Bk (black) colors, and the individual color images are overlapped over one another on paper, thus obtaining a four-color tonor image.

Figure 28:
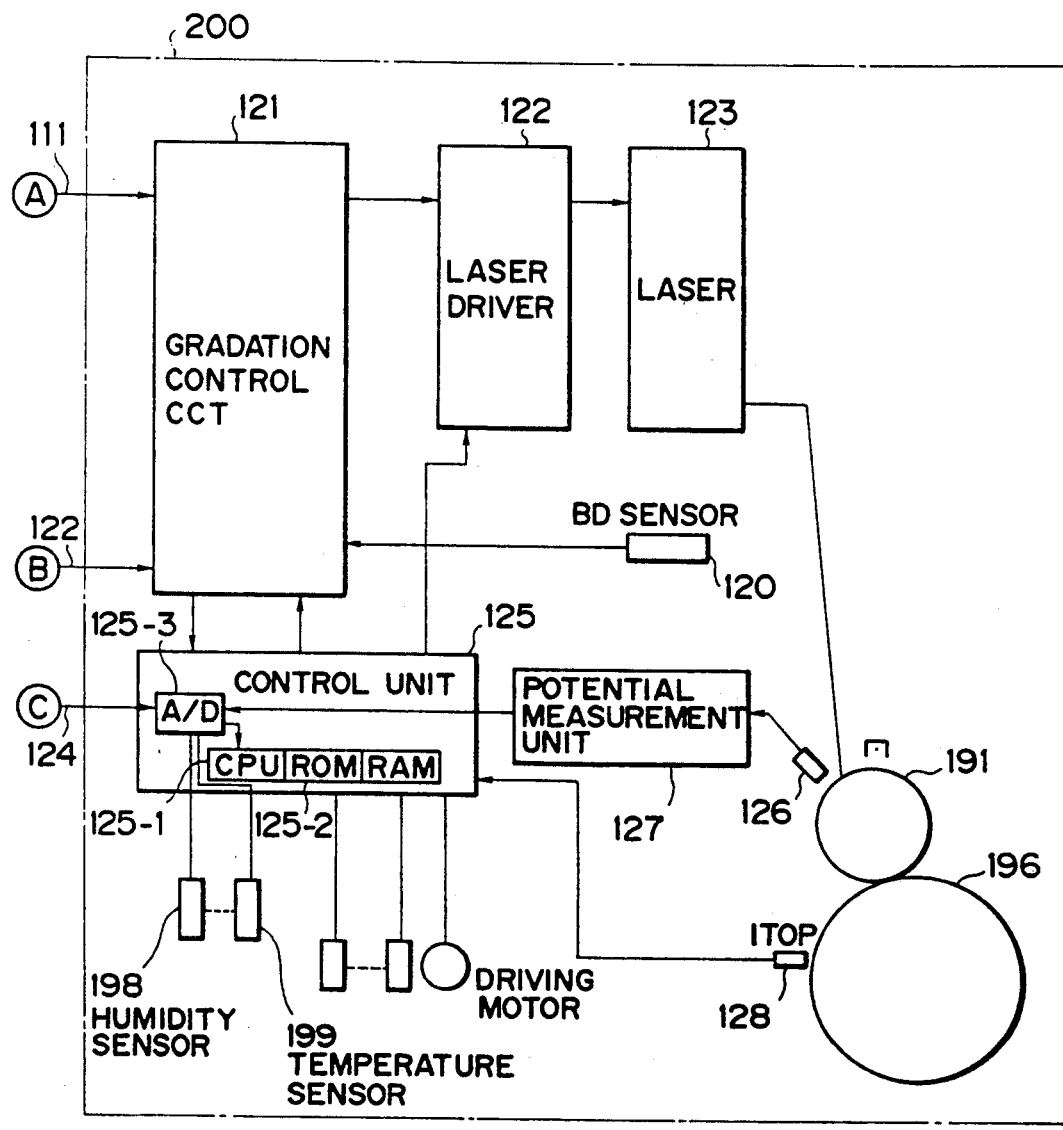
FIG. 28 is a schematic representation of a laser drive system including a processing block of the same embodiment color copier.

FIG. 28 is a block diagram showing a laser driver system inclusive of image processing block 88 in detail. The illustrated structure is the same as the structure shown in FIG. 8 except for gradation control circuit 121'.

Figure 29:
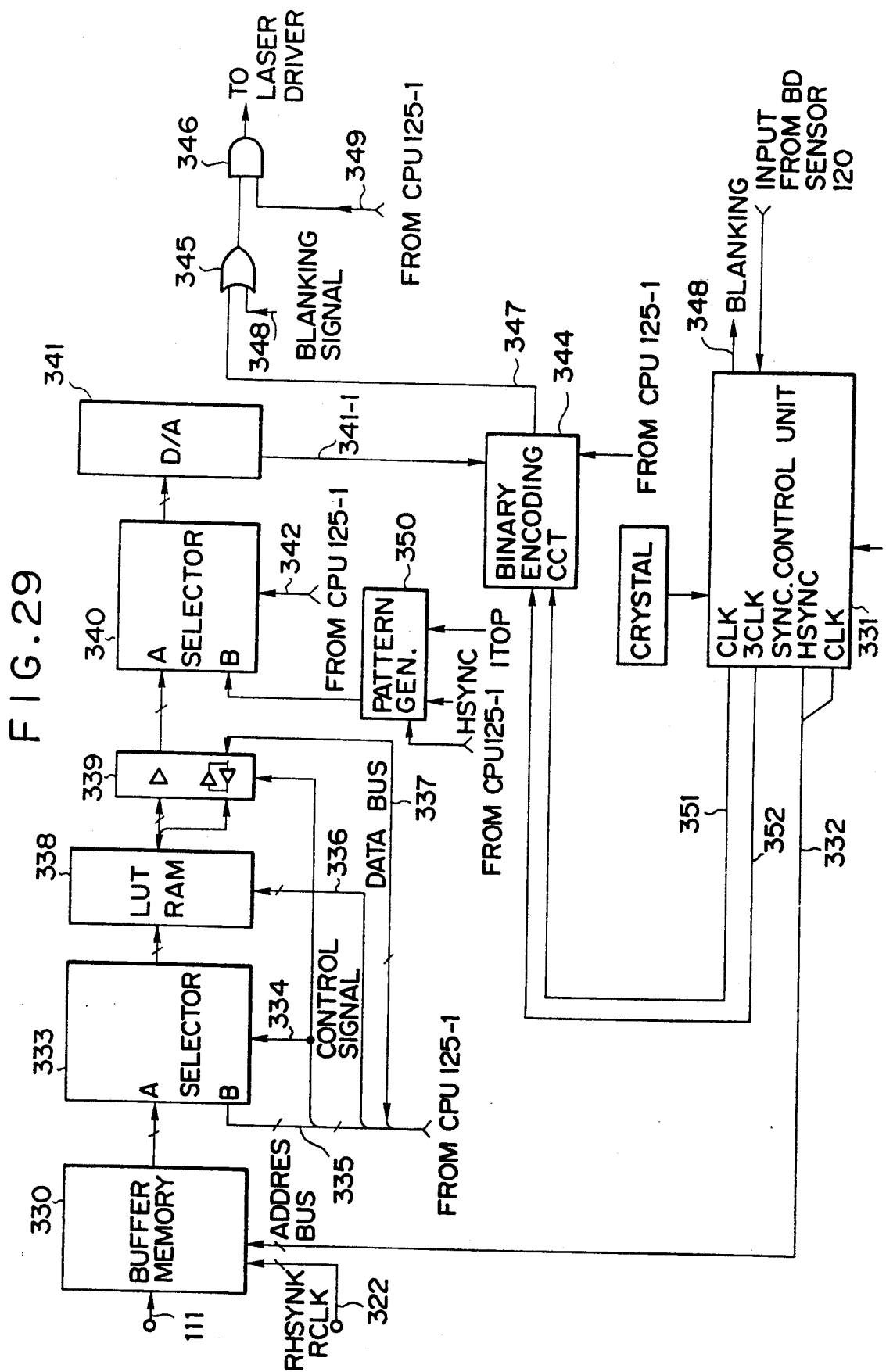
FIG. 29 is a block diagram showing a gradation control circuit.

FIG. 29 is a block diagram showing gradation control circuit 121'. Image data 111 provided as 8-bit data from image processing block 88 of reader unit 100 is supplied to buffer memory 330 in synchronism to synchronizing signal RHSYNC from a sync signal processing unit (not shown) and also with image clock RCLM. Image data stored in buffer memory 330 is read out from the same is synchronism with HSYNC and CLK signal 332 form sync signal control unit 331. In this way, synchronization shift and speed conversion between reader unit 100 and printer unit 200 are effected, and in this state image data is supplied to selector 333.

When selection signal 334 from CPU 125-1 of control unit 125 selects input "A" of selector 333, image data is supplied to address of look-up table RAM (LUTRAM) 338. At this time, CPU 125-1 causes reading data from LUTRAM 338 according to control signal 336, and LUTRAM 338 thus provides data corresponding to address input. Data provided from LUTRAM 338 is supplied to selector 339 to be supplied to next selector 340 according to selection signal 334 noted above. When selection signal 342 of selector 340 is selecting input "A", image data from selector 340 is supplied to D/A converter 341 for conversion to analog signal 341-1.

Figure 30:
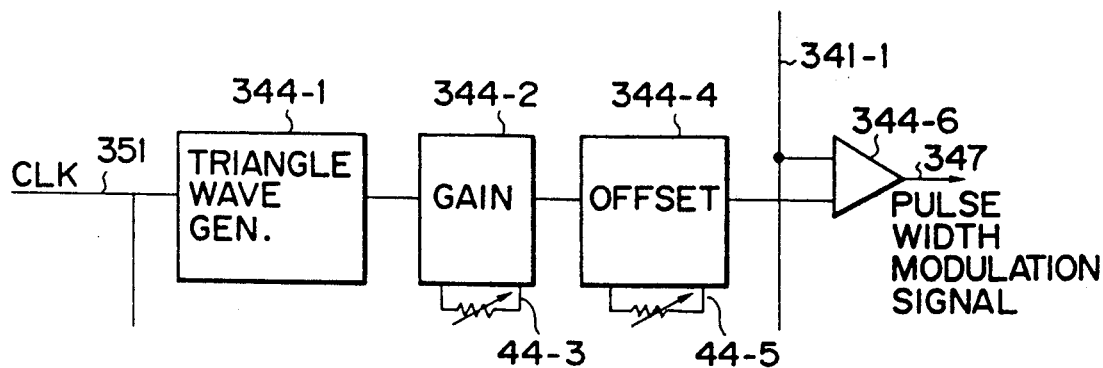
FIG. 30 is a block diagram showing a binary encoding circuit.

Image signal 341-1 having been converted to analog signal is subjected to binary encoding in binary encoding circuit 344. FIG. 30 shows a specific example of binary encoding circuit 344. Triangular wave generator 344-1 generates a triangular wave according to CLK signal 351 having a predetermined frequency provided from sync control unit 331, and the gain and off-set level of the triangular wave are adjusted with respective controls 344-3 and 344-5. Comparator 344-6 compares the adjusted triangular wave to analog image signal 341-1 to form a pulse width modulation (PWM) signal which is supplied to gate circuit 345.

The relation between the laser beam intensity and this pulse width is as shown in FIG. 25. In order to permit use of the linear portion of this characteristic curve as mush as possible with levels $00_H$ to $FF_H$ (hexadecimal) of image data, the gain and off-set controls noted above are manually adjusted using optical energy measurement unit in optical path such that minimum power level $00_H$ of image data corresponds to a point of curve turning to be linear while minimum power level $FF_H$ of image data corresponds to a point of curve turning to get out of the linearity.

Figure 26:
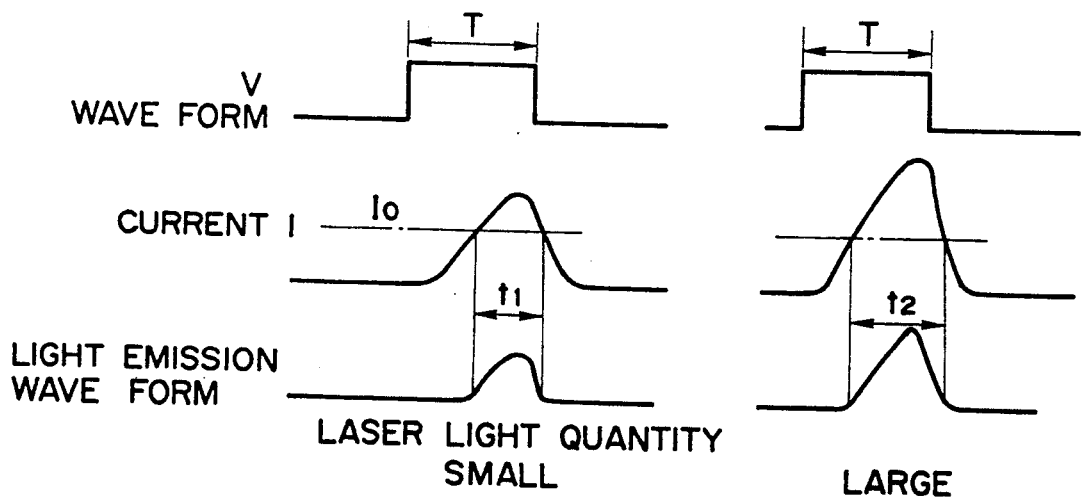
FIG. 26 is a view showing the relation between laser power and light waveform.

However, when laser power level switching as will be described later is performed, the laser starts to emit laser beam upon exceeding of a predetermined threshold current. Therefore, the laser beam intensity is varied with the same pulse as shown in FIG. 26 because the laser current is varied. Therefore, in the relation between laser beam intensity and pulse width given to laser driver 322 at the time of laser power level switching, different linear regions are formed like curves 1 and 2 as shown in FIG. 25. Curve 1 is formed when the laser power level is high, and curve 2 is formed when the level is low.

Accordingly, for obtaining equal image density with the same image data regardless of laser beam intensity changes, it is necessary to vary the pulse width at the time of laser beam intensity switching.

At this moment, it will be seen from FIG. 25 that it is mainly in the neighborhood of data $00_H$ corresponding to the start of laser beam emission that incluence of change in the linear region with respect to the pulse width appears at the time of laser beam intensity switching.

The laser beam intensity and linearity of laser beam intensity versus pulse width characteristic in the neighborhood of 00 have great influence on the image quality of the output image. Particularly, where an inverse development system is used, this corresponds to a highlight area in image and can not be ignored as image quality change.

Figure 31:
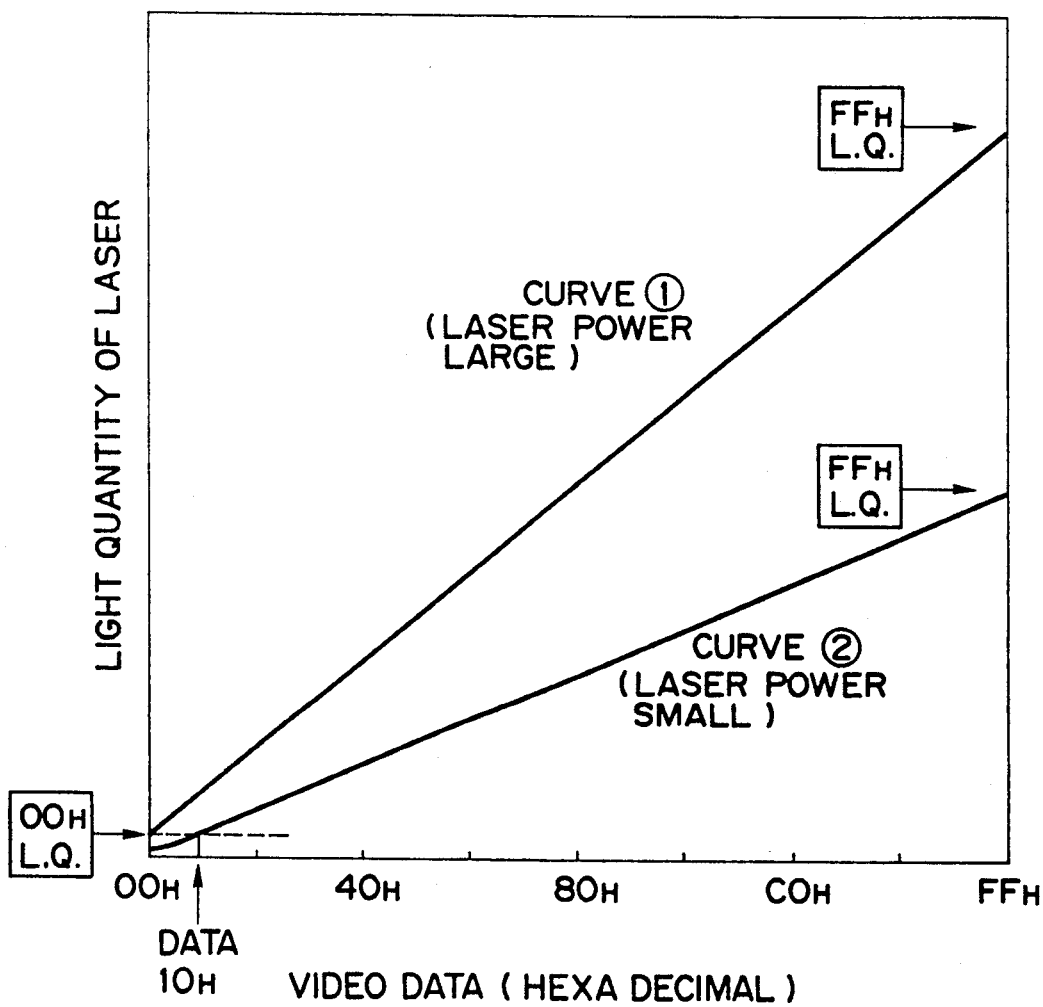
FIGS. 31 and 34 are graphs showing the relation between laser light quantity and video data.

In this embodiment, this problem is solved without provision of a plurality of binary encoding circuits as shown in FIG. 31 for respective laser beam intensity levels for switching but by correcting the pulse width of data.

This embodiment will now be described with reference to FIG. 31. In this case, the abscissa, unlike the pulse width of laser driving in FIGS. 8 and 9, is taken for video data $00_H$ to $FF_H$. At the time of actual image formation, only satisfactory linearity regions as shown in FIG. 31 are used.

Referring to FIG. 31, with curve 1 for higher laser power, PWM regulation, i.e., setting of pulse width of $00_H$ and $FF_H$ light intensities, is effected using binary encoding circuit 344 shown in FIG. 30.

It is seen that in case of lower laser power as represented by curve 2, by reducing the laser drive current to reduce laser power level the laser beam intensity is insufficient and linear region has not been reached yet in the neighborhood of data $00_H$ of curve 2. It is seen that with curve 2 in FIG. 31 linear region is reached in the neighborhood of data $10_H$.

Accordingly, in case when the laser power level is reduced in a state with PWM regulation (i.e., setting of pulse width of $00_H$ and $FF_H$ intensities) done with high laser power level, a linear region of $10_H$ to $FF_H$ may be used as video data. That is, in case of low laser power, video data 00 may be corrected to 10.

In this embodiment, correction of input data is effected in LUTRAM 338 in gradation control circuit 121' shown in FIG. 29. The contents of the correction are shown in FIG. 32.

Figure 32:
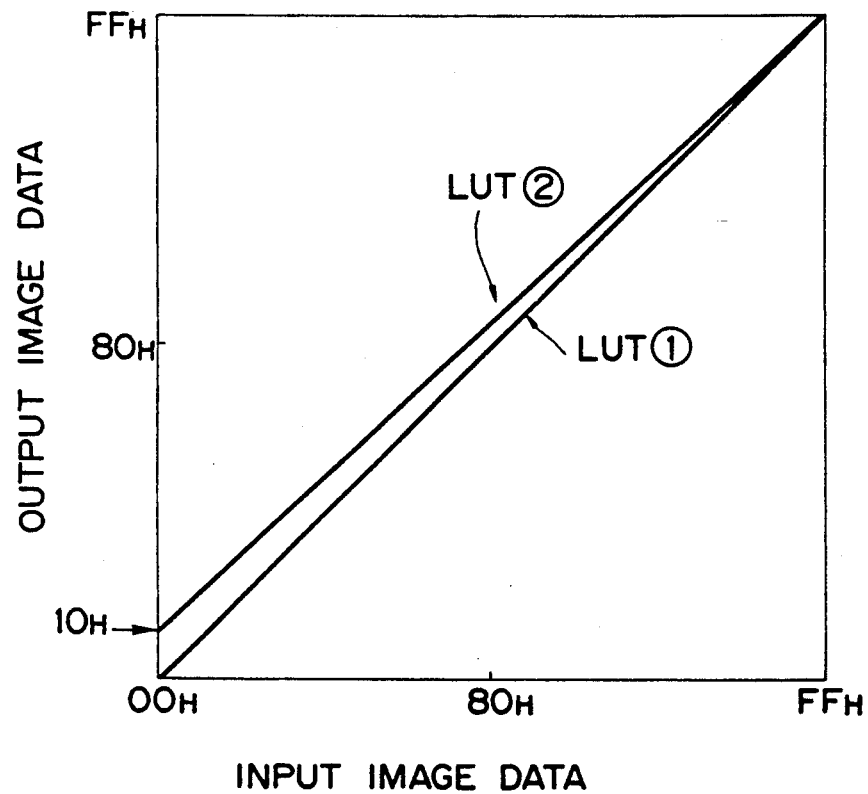
FIGS. 32 and 35 are graphs showing contents of LUT in the embodiment.

In FIG. 32, LUT 1 is used in case when providing output image data without correction of input image data with high laser power level.

LUT 2 is a table for correcting input image data such as to provide output image data $10_H$ with respect to input image data $00_H$ and provide output image data $10_H$ to $FF_H$ with respect to input image data $00_H$ to $FF_H$. It is used in the case of low laser power as noted before.

Thus, irrespective of change in laser power level the same gradation and image density can be obtained by providing corrected data with respect to the same image data.

Figure 33:
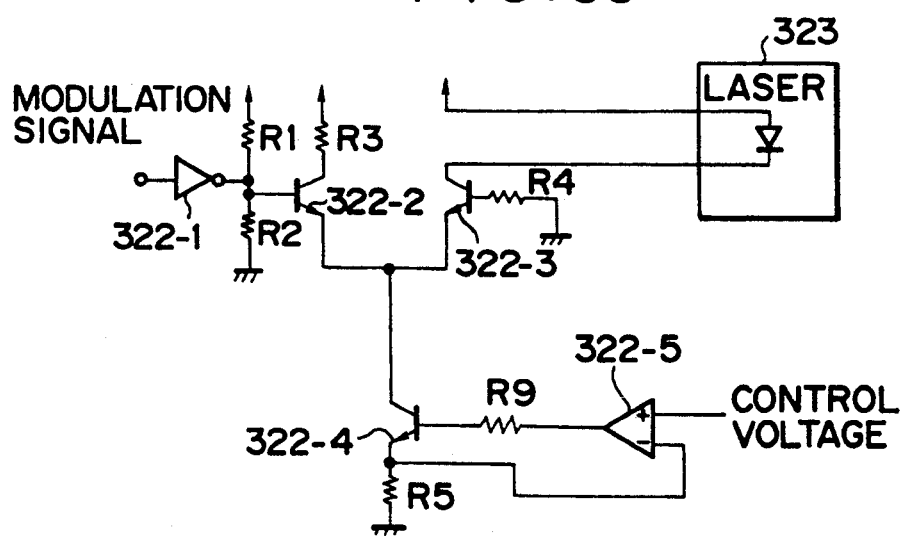
FIG. 33 is a circuit diagram showing a laser driver.

FIG. 33 shows laser driver 322 used in this embodiment in detail. Alteration of constant current supplied to laser 323 can be attained by changing the plus side input voltage to operational amplifier 322-5, and laser power level is switched.

The above embodiment has concerned laser beam intensity switching to two levels, but the invention is applicable to cases where the laser beam intensity can be switched to greater numbers of levels as well.

Figure 34:
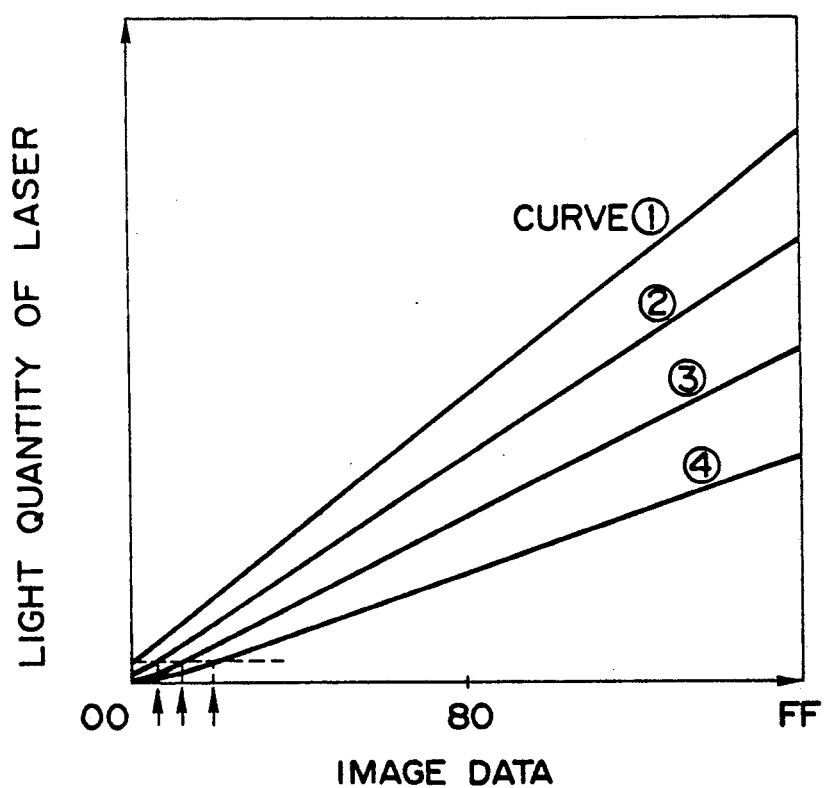
Figure 35:
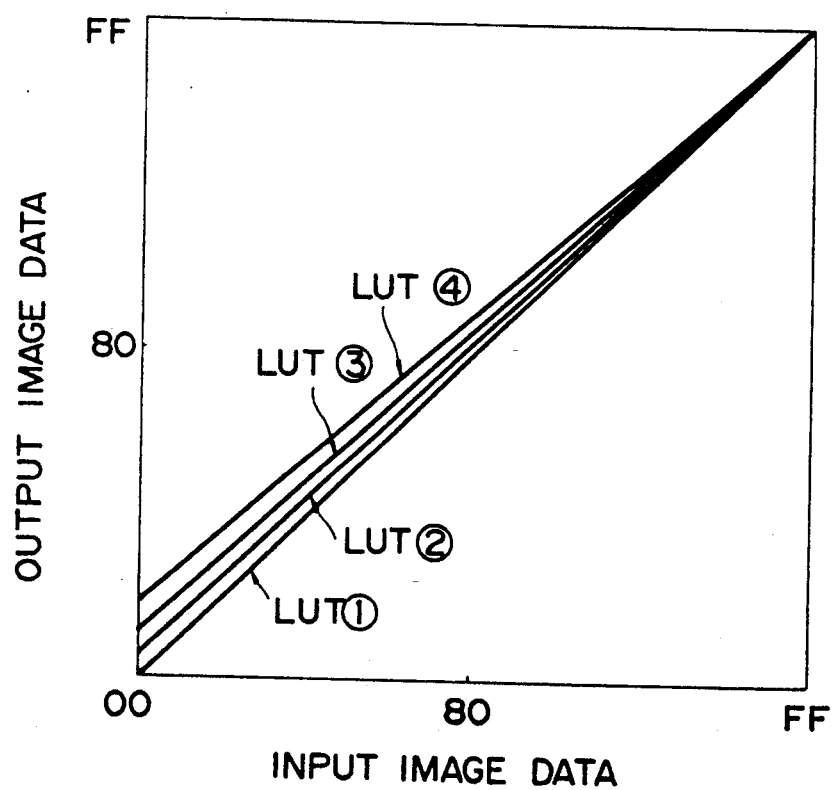
Figure 36:
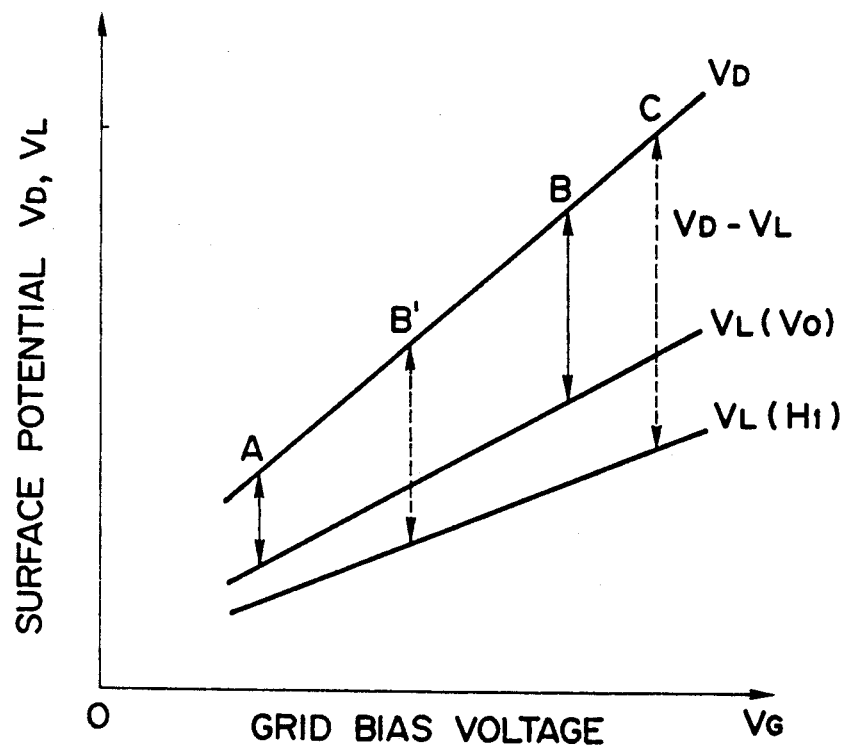
FIGS. 36, 37, 38A, 38B and 39 are graphs for explaining a prior art potential control system.
Figure 37:
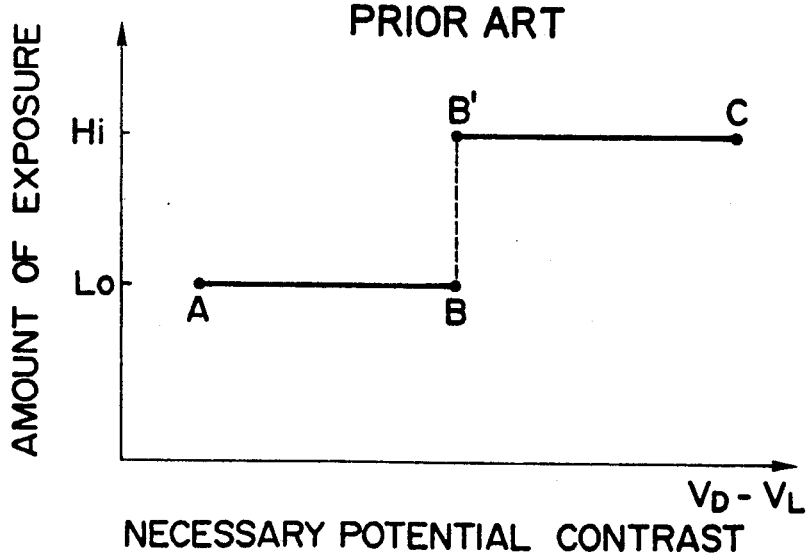
Figure 38B:
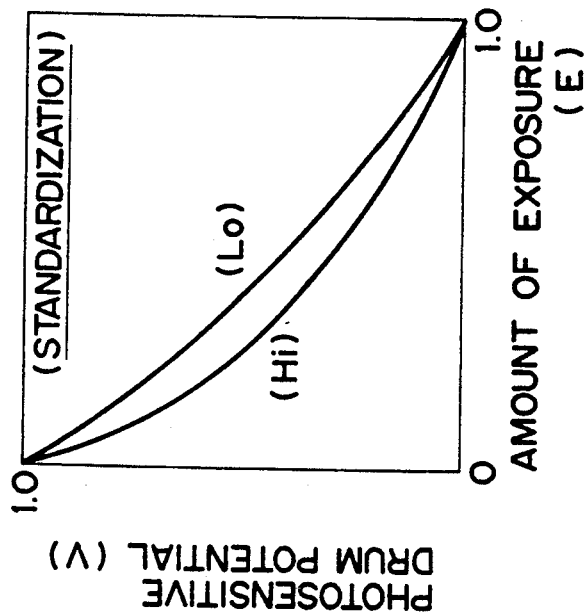
Figure 38A:
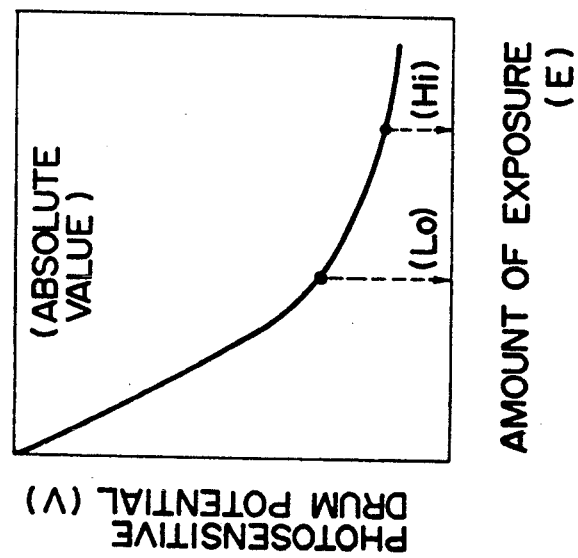
Figure 39:
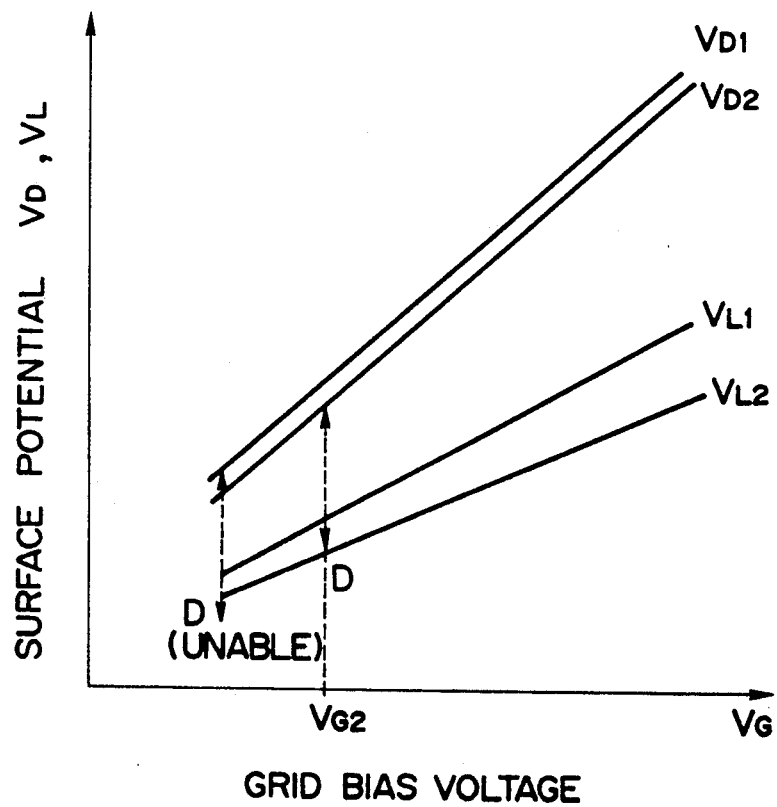

FIGS. 34 and 35 illustrate laser beam intensity versus image data characteristic and output image data versus input image data characteristic in case where four laser beam intensities are provided for switching, in conjunction with look-up tables LUT 1 to LUT 4. It will be understood that even when the number of laser beam intensity levels for switching is increased, it is possible to reproduce image with high quality without need of providing the corresponding number of binary encoding circuits but by providing the corresponding number of LUTs for correction.

Further, instead of step-by-step switching of the laser beam intensity, it is possible to permit continuous variation of the laser beam intensity.

In this embodiment, even when the laser beam intensity is changed, it is possible to provide an optimum pulse width drive signal by correcting an image signal to permit formation of high quality and stable image.

The above embodiments of the invention are by no means limitative, and various changes and modifications are possible without departing from the scope of the invention as defined in the claims.

We claim:

1. An image forming apparatus comprising:
   exposure means for emitting light pulse-width modulated in accordance with image information, the light quantity of said exposure means being variable;
   image forming means for forming an image on a photosensitive medium in accordance with light emitted from said exposure means;
   detecting means for detecting a plurality of surface states of said photosensitive medium, each said surface state corresponding to light emitted by said exposure means with different pulse widths; and
   control means for optimizing the light quantity of said exposure means in accordance with the output of said detecting means, wherein said control means obtains a potential versus pulse width variation characteristic of said photosensitive medium based on the plurality of surface states output from said detecting means and sets the light quantity of said exposure means such that said characteristic becomes approximately linear.

2. The image forming apparatus according to claim 1, wherein said exposure means includes laser beam generation means.

3. An image forming apparatus comprising:
   image forming means including exposure means, for forming an image on a photosensitive medium by means of exposure thereof according to image information;
   detecting means for detecting the sensitivity of said photosensitive medium;
   selecting means for selecting one of a plurality of different regions for use in connection with the light quantity of said exposure means in accordance with the result of detection by said detecting means, said regions overlapping each other; and
   switching means for varying the light quantity of said exposure means within said selected region in accordance with a parameter affecting sensitivity of the photosensitive medium.

4. The image forming apparatus according to claim 3, wherein said switching means switches the light quantity differently when increasing the light quantity of said exposure means and when reducing the light quantity of said exposure means.

5. The image forming apparatus according to claim 4, wherein said parameter affecting sensitivity represents a necessary potential contrast on said photosensitive medium.

6. The image forming apparatus according to one of claim 3 to 5, wherein said exposure means includes laser beam generation means.

7. An image forming apparatus comprising:
   image forming means including exposure means, for forming an image on a photosensitive medium by means of exposure thereof according to image information;
   detecting means for detecting the sensitivity of said photosensitive medium; and
   control means for controlling said exposure means for switching the light quantity of said photosensitive medium in accordance with the detection by said detecting means, wherein said control means controls said exposure means for switching the amount of exposure of said photosensitive medium based on different detections when increasing the exposure amount and when reducing the exposure amount.

8. The image forming apparatus according to claim 7, wherein said detected sensitivity is a necessary potential contrast of the photosensitive medium.

9. An image forming apparatus comprising:
   exposure means for emitting light modulated in accordance with input means information;
   image forming means for forming an image on a photosensitive medium in accordance with light emitted from said exposure means;
   detecting means for detecting the sensitivity of said photosensitive medium;
   switching means for switching the exposure energy of said exposure means in accordance with the result of detection by said detecting means; and
   compensating means for compensating said image information in response to switching of exposure energy by said switching means.

10. The image forming apparatus according to claim 9, wherein exposure means is modulated by a signal having been pulse width modulated according to said image data.

11. The image forming apparatus according to claim 9, wherein said detecting means detects a potential contrast on said photosensitive medium.

12. The image forming apparatus according to one of claims 9 to 11, wherein said exposure means includes laser beam generation means.

13. The image forming apparatus according to one of claims 7 or 8, wherein said exposure means includes laser beam generation means.

14. An image forming apparatus comprising:
   image forming means for forming an image on a medium according to image information;
   obtaining means for obtaining a parameter affecting image quality output by said image forming means; and
   switching means for switching a variable condition of said image forming means based on said parameter, wherein said switching means changes the variable condition based on different values of the parameter when increasing the variable condition and when reducing the variable condition.

15. An apparatus according to claim 14, wherein said image forming means is an electrophotographic apparatus which forms an image by a modulated light on a photosensitive medium.

16. An apparatus according to claim 15, wherein said variable condition is a quantity of said modulated light.

17. An apparatus according to claim 15, further comprising detection means for detecting a surface potential on said photosensitive medium; and wherein said obtaining means obtains said parameter on the basis of a detection output of said detection means.

18. An apparatus according to claim 17, wherein said parameter represents a necessary potential contrast on said photosensitive medium.

19. The image forming apparatus according to claim 2, wherein said detecting means detects the surface state of the photosensitive drum exposed the emitted light having a pulse width corresponding to intermediate densities.

20. The image forming apparatus according to one of claims 1, 2 or 19, wherein said detecting means detects the surface potential on said photosensitive medium.

* * * * *

UNITED STATES PATENT AND TRADEMARK OFFICE
CERTIFICATE OF CORRECTION

PATENT NO. : 5,153,609

DATED : October 6, 1992

INVENTOR(S) : Toshinori Ando, et al.

It is certified that error appears in the above-identified patent and that said Letters Patent is hereby corrected as shown below:

COLUMN 3

Line 45, "tobetween sensitive" should read --tosensitive--.

COLUMN 5

Line 49, "is" should be deleted.

COLUMN 6

Line 46, "cruch" should read --crunch--; and
Line 68, "charger" should read --charger 3--.

COLUMN 7

Line 19, "OO" should read --00--.

COLUMN 8

Line 56, "AH" should read --$\Delta H$--.

COLUMN 10

Line 33, "$P_1-P_2 \rightarrow P_3$" should read --$P_1 \rightarrow P_2 \rightarrow P_3 \ldots$--; and
Line 59, "$V_{00}-V_{FF}V_{FF}$" should read --$V_{00}-V_{FF}$--.

UNITED STATES PATENT AND TRADEMARK OFFICE
CERTIFICATE OF CORRECTION

PATENT NO. : 5,153,609

DATED : October 6, 1992

INVENTOR(S) : Toshinori Ando, et al.

It is certified that error appears in the above-identified patent and that said Letters Patent is hereby corrected as shown below:

COLUMN 11

Line 32, "develope" should read --develop--;
Line 33, "drum 4" should read --drum 204--;
Line 50, "drum 4" should read --drum 204--; and
Line 62, "electrode 7," should read --electrode 207,--.

COLUMN 14

Line 21, "$V_3-V_L$" should read --$V_D-V_L$--;
Line 23, "P" should read --$P_4$--; and
Line 67, "corresponding" should read --($V_{00}$, corresponding--.

COLUMN 16

Line 30, "color-disassembly" should read --color-disassembled--.

COLUMN 17

Line 8, "RCLM" should read --RCLIC--;
Line 10, "is" should read --in-- and "form" should read --from--;

UNITED STATES PATENT AND TRADEMARK OFFICE
CERTIFICATE OF CORRECTION

PATENT NO. : 5,153,609
DATED : October 6, 1992
INVENTOR(S) : Toshinori Ando, et al.

It is certified that error appears in the above-identified patent and that said Letters Patent is hereby corrected as shown below:

OLUMN 17 (Cont.)

Line 54, "threshold" should be deleted.

OLUMN 18

Line 1, "incluence" should read --influence--.

Signed and Sealed this

Twenty-first Day of December, 1993

Attest:

BRUCE LEHMAN

Attesting Officer      Commissioner of Patents and Trademarks